United States Patent
Sharma et al.

(10) Patent No.: US 12,520,331 B2
(45) Date of Patent: Jan. 6, 2026

(54) METHOD FOR COMMUNICATIONS DEVICE AND COMMUNICATIONS DEVICE FOR DETERMINING PERMITTED USE OF SIDELINK COMMUNICATIONS

(71) Applicant: Sony Group Corporation, Tokyo (JP)

(72) Inventors: Vivek Sharma, Basingstoke (GB); Kazuyuki Shimezawa, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 304 days.

(21) Appl. No.: 18/027,154

(22) PCT Filed: Sep. 10, 2021

(86) PCT No.: PCT/EP2021/075006
§ 371 (c)(1),
(2) Date: Mar. 20, 2023

(87) PCT Pub. No.: WO2022/073720
PCT Pub. Date: Apr. 14, 2022

(65) Prior Publication Data
US 2023/0337262 A1    Oct. 19, 2023

(30) Foreign Application Priority Data
Oct. 8, 2020   (EP) ..................... 20200909

(51) Int. Cl.
*H04W 72/40*   (2023.01)
*H04W 16/14*   (2009.01)
*H04W 88/04*   (2009.01)

(52) U.S. Cl.
CPC .......... *H04W 72/40* (2023.01); *H04W 16/14* (2013.01); *H04W 88/04* (2013.01)

(58) Field of Classification Search
CPC ..... H04W 72/40; H04W 16/14; H04W 88/04; H04W 36/04; H04W 16/24; H04W 48/20;
(Continued)

(56) References Cited

U.S. PATENT DOCUMENTS

| | | | |
|---|---|---|---|
| 2018/0049143 A1 | 2/2018 | Gupta et al. | |
| 2018/0242184 A1 | 8/2018 | Yerramalli et al. | |
| 2021/0022056 A1* | 1/2021 | Lee | H04W 48/20 |
| 2021/0314938 A1* | 10/2021 | Kim | H04W 76/10 |

(Continued)

FOREIGN PATENT DOCUMENTS

| | | |
|---|---|---|
| WO | 2019/216618 A1 | 11/2019 |
| WO | 2020/131932 A2 | 6/2020 |

OTHER PUBLICATIONS

WO_2021223046_A1 (Year: 2021).*
(Continued)

*Primary Examiner* — Rushil P. Sampat
(74) *Attorney, Agent, or Firm* — XSENSUS LLP

(57) ABSTRACT

A method for a communications device which is configurable to transmit or receive data on a sidelink using communication resources of a first frequency range and is configurable to transmit or receive data on a sidelink using communications resources of a second frequency range, the first frequency range being a licensed frequency range, and the second frequency range being an unlicensed frequency range, the method including determining that the communications device is not permitted to transmit the data on a sidelink using communication resources of the first frequency range, determining that the communications device is permitted to transmit the data on a sidelink using communication resources of the second frequency range, and transmitting or receiving data on a sidelink using communication resources of the second frequency range.

18 Claims, 7 Drawing Sheets

(58) Field of Classification Search
CPC ............ H04W 74/0808; H04W 76/27; H04W 74/0816; H04W 74/0866; H04W 74/006; H04W 92/18; H04L 5/001; H04L 5/0033; H04L 27/0006; H04L 27/00; H04L 5/0044; H04L 5/0053; H04L 5/0064; H04L 5/0094
See application file for complete search history.

(56) References Cited

U.S. PATENT DOCUMENTS

| | | | | |
|---|---|---|---|---|
| 2022/0312422 A1* | 9/2022 | Lee | ........................ | H04W 72/02 |
| 2022/0394735 A1* | 12/2022 | Lee | ........................ | H04W 4/40 |
| 2022/0408412 A1* | 12/2022 | Lee | ........................ | H04L 1/1893 |
| 2023/0138096 A1* | 5/2023 | Zhao | ...................... | H04W 72/40 |
| | | | | 370/329 |
| 2023/0171815 A1* | 6/2023 | Xue | ...................... | H04L 5/0044 |
| | | | | 370/329 |
| 2023/0276464 A1* | 8/2023 | Yu | ........................ | H04W 72/25 |
| | | | | 370/329 |

OTHER PUBLICATIONS

WO_2022016545_A1 (Year: 2022).*
International Search Report and Written Opinion mailed on Feb. 14, 2022, received for PCT Application PCT/EP2021/075006, filed on Sep. 10, 2021, 15 pages.

3GPP, "NR; Study on NR Vehicle-to-Everything (V2X) (Release 16)", 3GPP Tr 38.885 V16.0.0, Mar. 2019, pp. 1-122.
3GPP, Technical Specification Group Services and System Aspects; Architecture enhancements for 5G System (5GS) to support Vehicle-to-Everything (V2X) services (Release 16), 3GPP TS 23.287 V16.4.0, Sep. 2020, 58 pages.
3GPP, "Technical Specification Group Radio Access Network; NR; NR and NG-RAN Overall Description; Stage 2 (Release 15)", 3GPP TS 38.300 V15.2.0, Jun. 2018, pp. 1-87.
Holma et al., "LTE for Umts ofdma and SC-FDMA Based Radio Access", John Wiley & Sons, 2009, 232 pages.
3GPP, "Technical Specification Group Services and System Aspects; Architecture enhancements for 5G System (5GS) to support Vehicle-to-Everything (V2X) services (Release 16)", 3GPP Ts 23.287 V16.3.0, Jul. 2020, pp. 1-57.
3GPP, "Technical Specification Group Radio Access Network; Evolved Universal Terrestrial Radio Access (E-UTRA); Layer 2—Measurements (Release 16)", 3GPP TS 36.314 V16.0.0, Jul. 2020, pp. 1-28.
3GPP, "Technical Specification Group Radio Access Network; NR; User Equipment (UE) radio transmission and reception; Part 1: Range 1 Standalone (Release 16)", 3GPP TS 38.101-1 V16.4.0, Jun. 2020, pp. 1-406.
3GPP, "Technical Specification Group Services and System Aspects; Security aspects of 3GPP support for advanced Vehicle-to-Everything (V2X) services (Release 16)", 3GPP TS 33.536 V16.1.0, Sep. 2020, pp. 1-23.

* cited by examiner

METHOD FOR COMMUNICATIONS DEVICE AND COMMUNICATIONS DEVICE FOR DETERMINING PERMITTED USE OF SIDELINK COMMUNICATIONS

CROSS-REFERENCE TO RELATED APPLICATIONS

The present application is based on PCT filing PCT/EP2021/075006, filed Sep. 10, 2021, which claims priority to European Patent Application No. 20200909.8, filed Oct. 8, 2020, the entire contents of each are incorporated herein by reference.

BACKGROUND

Field

The present disclosure relates to communications devices, infrastructure equipment and methods for the transmission of data via a sidelink of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

In order to reduce power consumption, make efficient use of available spectrum, and/or for any other reason, communications devices may be configured to communicate using a sidelink connection with, or via, a relay communications device. However, this gives rise to new challenges for efficiently handling communications in wireless telecommunications systems that need to be addressed.

SUMMARY

The present disclosure can help address or mitigate at least some of the issues discussed above. Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution (LTE) Wireless Communications System

Figure 1:
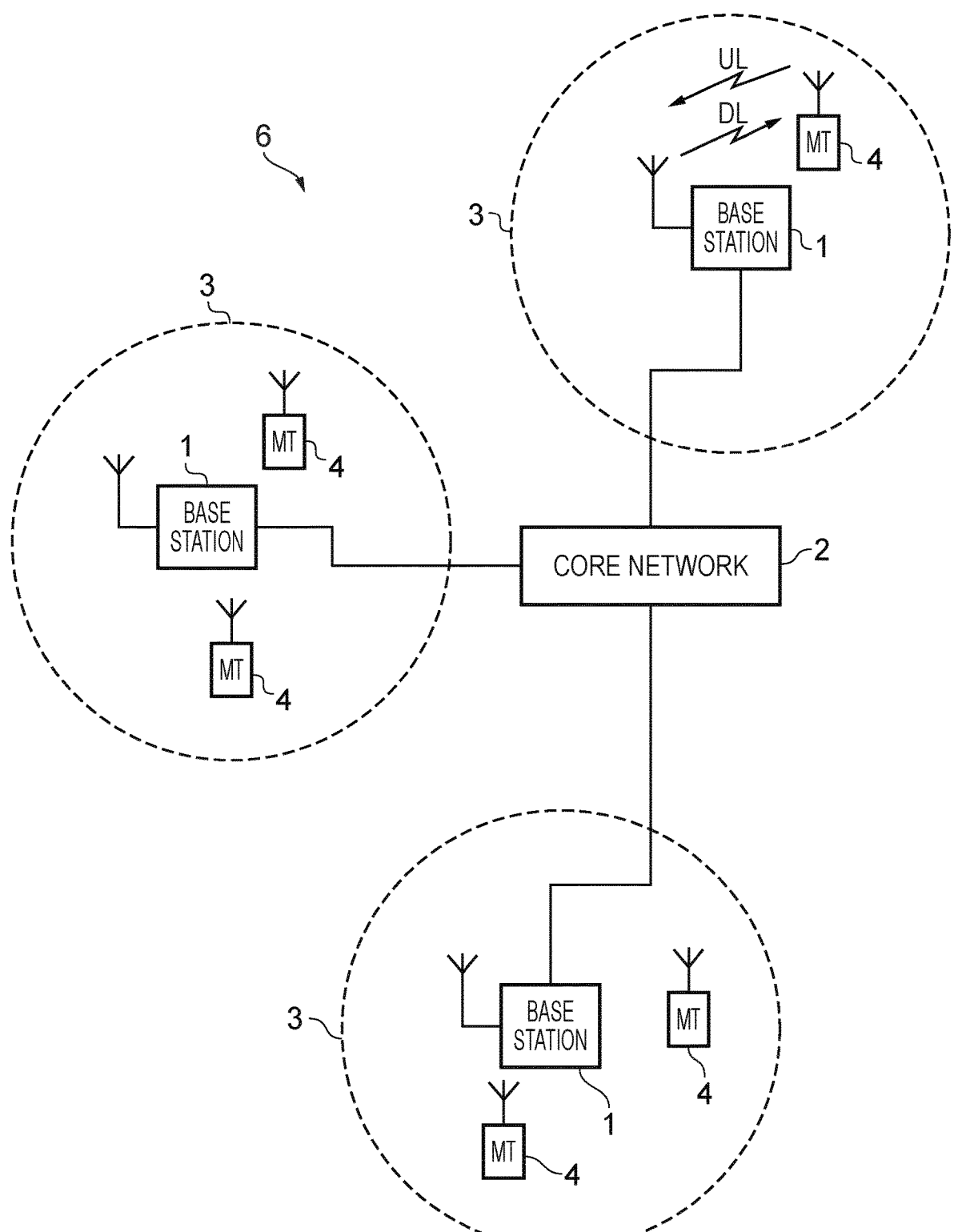
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
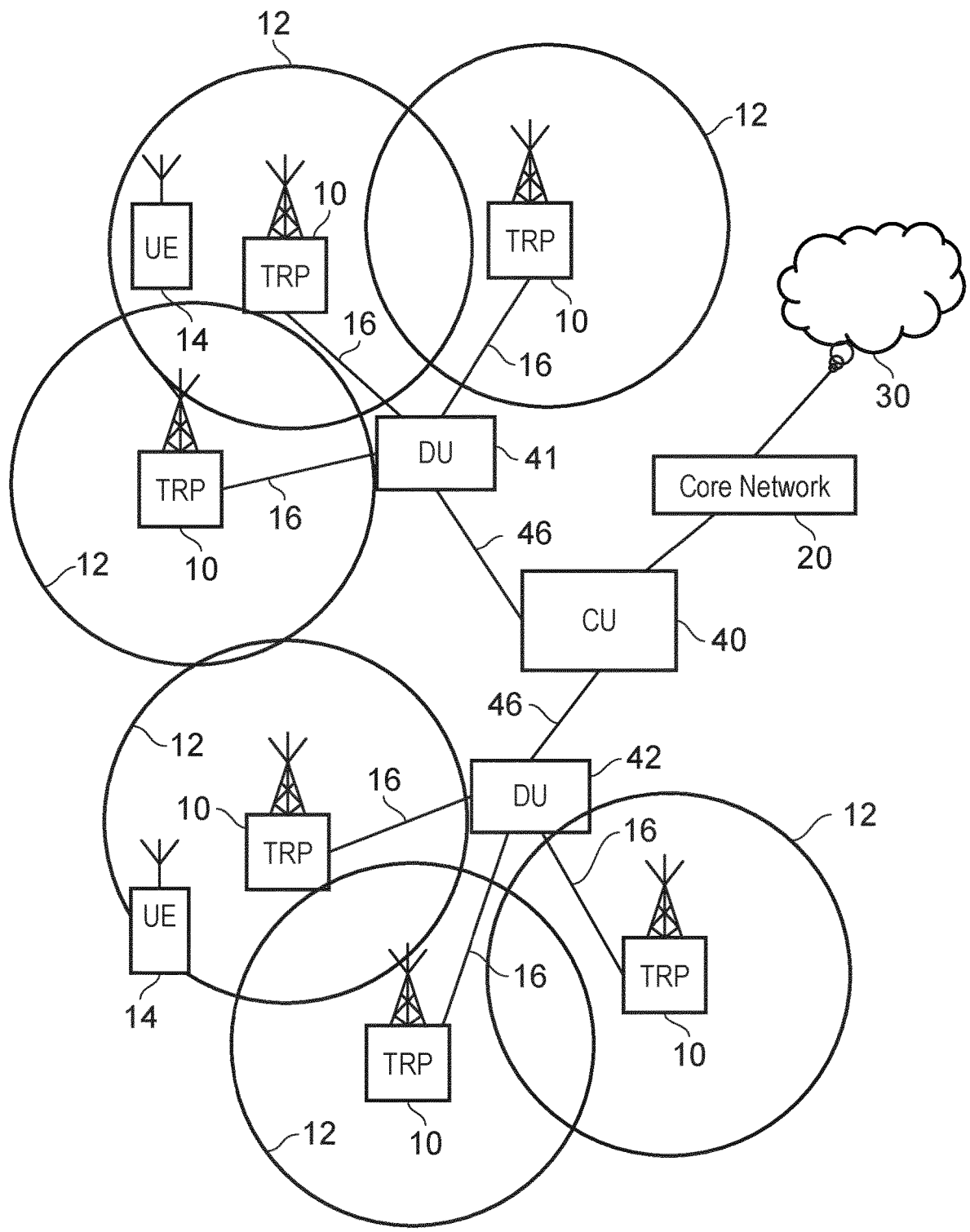
FIG. 2 schematically represents some aspects of a new radio access technology (RAT) wireless telecommunications system which may be configured to operate in accordance with certain embodiments of the present disclosure.

An example configuration of a wireless communications network which uses some of the terminology proposed for NR and 5G is shown in FIG. 2. 3GPP have worked to define a New Radio Access Technology (NR) [1]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Conventionally, in a cellular communications network, a wireless communications device (such as the communications devices 4 of FIG. 1 and the communications devices 14 of FIG. 2) which may be mobile, communicates directly with infrastructure equipment of the network (such as base stations 1 of FIG. 1 and TRPs 10 of FIG. 2). Examples of such infrastructure equipment include base stations which in specific contexts may be referred to as nodeBs, eNodeBs (eNBs) or gNodeBs (gNBs).

This direct communication may be via a wireless access interface which uses communication resources under the full or partial control of the network. In particular, the communication resources may use carrier frequencies which may be licensed, or 'operator managed' in the geographic area covered by the network.

However, it has also been proposed that communications devices may communicate directly between each other, either using licensed spectrum or unlicensed spectrum. This type of communication may generally be referred to as 'device-to-device' (D2D) communication, and may include the case where the device-to-device communication is provided in order to allow a 'remote' communications device to transmit or receive data from the network via a 'relay' communications device (whether or not the remote communications device is within communications range of an infrastructure equipment of the network).

In other scenarios, device-to-device communication may permit communications devices to communicate data directly between each other, without the data traversing any infrastructure equipment of the network. This latter scenario may permit, for example, communication between devices where there is no coverage of any infrastructure equipment.

A wireless access interface which is used for device-to-device communication is herein referred to as a sidelink.

An example scenario in which embodiments of the present technique may be deployed is a personal internet of things "PIoT" network. A PIoT network may comprise one or more PIoT devices communicating between themselves and a 'master user equipment (UE)'. The master UE may be a smartphone, residential gateway, or the like, and may provide connectivity to a cellular network, such as a 3GPP 5G radio access network. Connections within the PIoT network may be by means of device-to-device communication, and the master UE may act as a relay. Where the master UE or 'gateway UE' connects to a 5G network, the master UE may be referred to in some scenarios as a 5G residential gateway (5G-RG).

Figure 3:
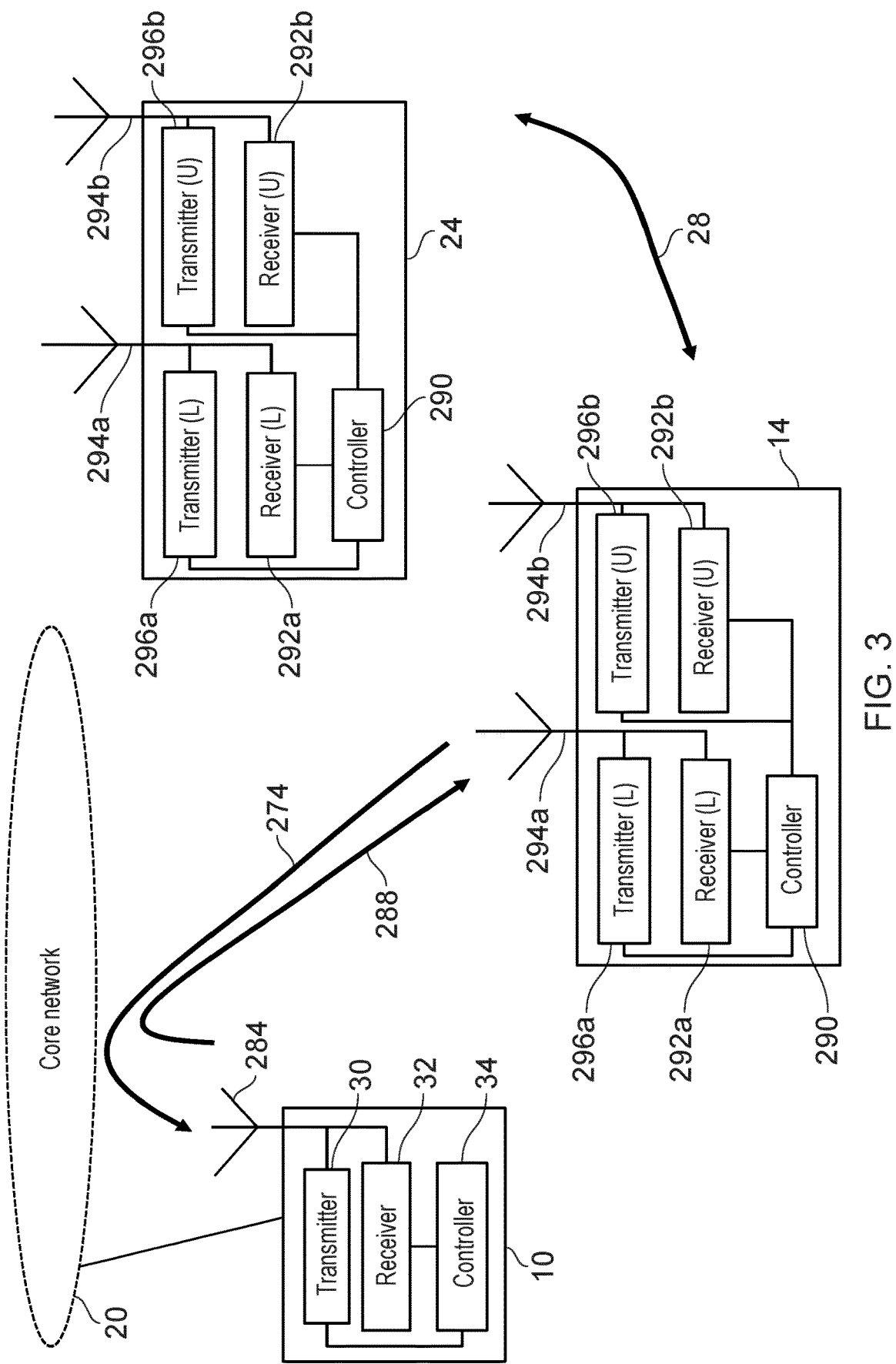
FIG. 3 is a schematic block diagram of example infrastructure equipment and communications devices configured in accordance with example embodiments.

FIG. 3 illustrates in more details communications devices and infrastructure equipment which may be adapted in accordance with embodiments of the present technique, and in particular illustrates the use of a sidelink for device-to-device communications.

In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more communications devices via a wireless access interface via an antenna 284.

In FIG. 3, an example communications device 14 is shown, which communicates with the TRP 10 via the wireless access interface by transmitting signals on an uplink 274 and receiving signals on a downlink 288.

For communicating via the wireless access interface, the communications device 14 comprises a wireless transmitter 296a and a wireless receiver 292a, which are connected to an antenna 294a and are controlled by a controller or controlling processor 290.

The wireless transmitter 296a, wireless receiver 292a and antenna 294a allow the communications device 14 to communicate via the wireless access interface provided by the TRP 10. This wireless access interface may use communication resources within a frequency range which is licenced to and/or managed by an operator of the wireless communications network. Accordingly, the wireless transmitter 296a, wireless receiver 292a are designed in FIG. 3 by "(L)" to indicate that they are for operation using licensed spectrum, as further described below.

In addition, the communications device 14 comprises a second wireless transmitter 296b, a second wireless receiver 292b and a second antenna 294b, which are adapted for communications using communication resources which are in unlicensed ("U") spectrum. The controller 290 is configured to control the second wireless transmitter 296b and the second wireless receiver 292b.

FIG. 3 also shows a second communications device 24, which comprises the same elements as the first communications device 14.

In the arrangement shown in FIG. 3, the first communications device 14 is configured to function as a relay communications device ("relay UE"), allowing the second remote communications device 24 to function as a remote communications device ("remote UE"). As such, the relay UE 14 and remote UE 24 can communicate directly using a sidelink wireless access interface 28. The sidelink 28 may use communication resources in licensed or unlicensed spectrum, or a combination of both, as will be further described below. The first communications device 14, acting as a relay, may thus be a gateway, a 5G-RG and/or a master UE.

When the sidelink 28 uses unlicensed spectrum, the second transmitters 296b and second receivers 292b are controlled by the controllers 290 to transmit and receive using the sidelink. When the sidelink 28 uses licensed spectrum, the first transmitters 296a and first receivers 292a are controlled by the controllers 290 to transmit and receive using the sidelink.

In some scenarios, the second communications device 24 may be within range of the TRP 10, and accordingly may additionally communicate directly with the TRP 10 using the wireless access interface provided by the TRP 10.

The transmitters 296a, 296b, 30 and the receivers 32, 292a, 292b (as well as other transmitters, receivers and transceivers described in relation to examples and embodiments of the present disclosure) may include radio frequency filters and amplifiers as well as signal processing components and devices in order to transmit and receive radio signals in accordance with a particular standard. For example, the transmitters 296a, 30 and the receivers 32, 292a, for allowing communication via the uplink 274 and downlink 288 of the wireless access interface provided by the TRP 10 may be configured in accordance with the 5G/NR standard. The second transmitters 296b and the second receivers 292b, for allowing communication via the a sidelink using unlicensed spectrum may be configured in accordance with a Bluetooth® or IEEE 802.11/WiFi® standard.

It will be appreciated that in some embodiments, within one of the first communications device 14 and/or the second communications device 24, one or more of the first transmitter 296a, second transmitter 296a, first receiver 292a and second receiver 292b may be combined. In addition, the first and second antennas 294a, 294b may be combined.

The controllers 34, 290 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Not shown in FIG. 3, the TRP 10 also includes a network interface which connects to a DU (such as the DU 42 shown in FIG. 2) via a physical interface. The network interface therefore provides a communication link for data and signalling traffic from the TRP 10 via the DU 42 and the CU 40 to the core network 20.

The interface between the DU 42 and the CU 40 may be known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

In FIG. 2 and FIG. 3, the relay UE 14 is connected to the core network via infrastructure equipment (TRP 10) providing a wireless access interface, the TRP 10 being connected directly to the core network 20.

In some embodiments, the connection between the relay UE 14 and the core network may be via a wireless backhaul interface provided by an infrastructure equipment. In an example of such an arrangement, the relay UE 14 may function as an 'integrated access and backhaul' (IAB) node. As in FIG. 3, the relay UE 14, acting as a relay, may be a gateway, a 5G-RG and/or a master UE.

Figure 4:
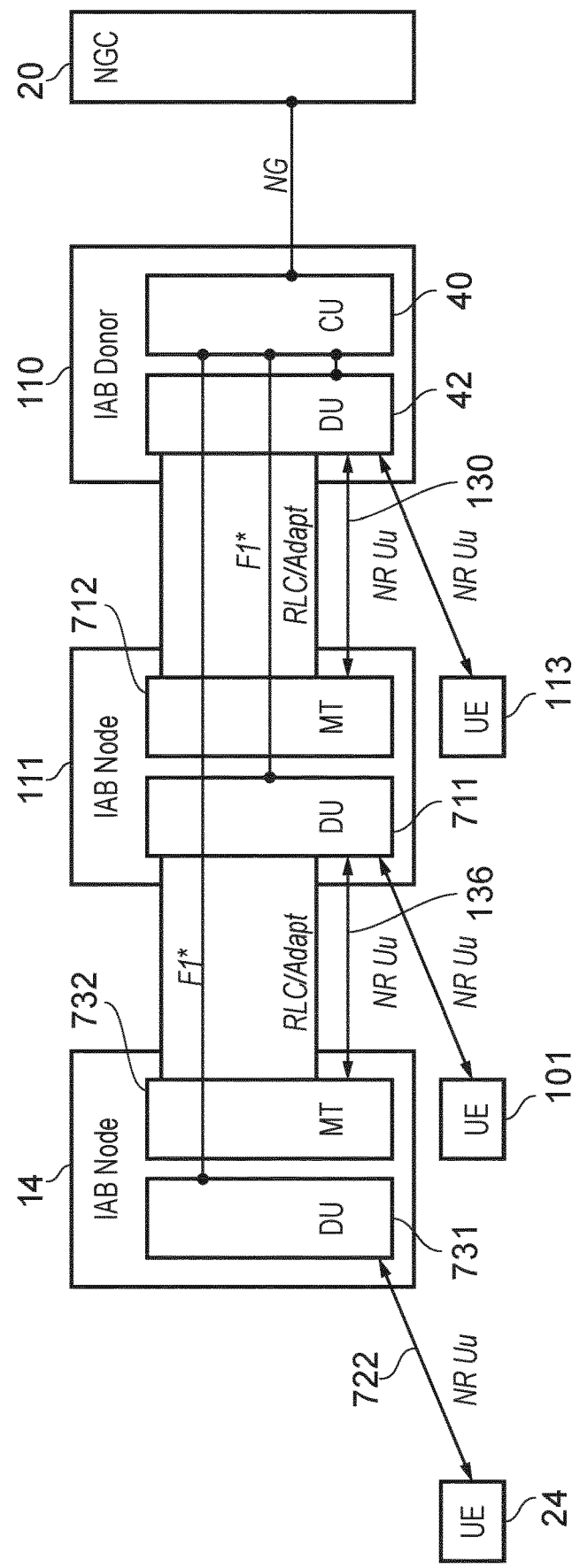
FIG. 4 is a schematic block diagram of further example infrastructure equipment and communications devices configured in accordance with example embodiments.

FIG. 4 shows an arrangement in which the relay communications device 14 and a first infrastructure equipment 111 function as IAB nodes which are connected to the core network 20 via a wireless communications link 130 to a second infrastructure equipment (an IAB Donor) 110, the second infrastructure equipment 110 being directly connected to the core network 20.

Each of the relay communications device 14 and first and second infrastructure equipment 111, 110 may provide a wireless access interface for allowing communications devices 101, 113 and remote communications device 24 to connect to the communications network. Communication resources used for backhaul transmissions between the IAB nodes (relay communications device 14 and first infrastructure equipment) 14, 111 may be a subset of those associated with the wireless access interface 136 provided by the first infrastructure equipment 111. Similarly, communication resources used for backhaul transmissions between the IAB nodes and the IAB donor 110 may be a subset of those associated with the wireless access interface 130 provided by the second infrastructure equipment (IAB donor) 110.

In FIG. 4, each of the IAB nodes 14, 111 and the IAB donor 110 includes a distributed unit (DU) 731, 711, 42 which communicates with, respectively, the UEs 24, 101, 113. In addition, the DUs 42, 511 associated with the IAB donor 110 and the first infrastructure equipment 111 communicate with the respective downstream IAB nodes 111, 14. Each of the IAB nodes 14, 111 (not including the IAB donor 110) includes mobile terminal (MT) functionality 732, 712 which includes a transmitter and receiver (not shown) for transmitting and receiving data to and from the DU of an upstream IAB node/IAB donor and an associated controller (not shown). The inter-node wireless communications links 130, 136 may be in the form of new radio (NR) "Uu" wireless interface. The mobile terminal functionality 712, 732 may correspond substantially to that of a conventional user equipment (UE), at least at the access stratum (AS) layer. Notably, however, MT functionality may not be associated with a subscriber identity module (SIM) application, in contrast to a UE which may be conventionally considered to be the combination of an MT function and a SIM application.

The Uu wireless interfaces used by IAB nodes to communicate with each other may also be used by UEs to transmit and receive data to and from the DU of the upstream IAB node. For example, the Uu interface 720 which is used by the first infrastructure equipment 111 for communication with the donor node 110 may also be used by the UE 113 to transmit and receive data to and from the donor node 110.

As in the example of FIG. 3, the relay communications device 14 may comprise functionality (not shown in FIG. 4) for transmission and reception of signals via unlicensed spectrum, and thus may communicate with remote communications devices (such as the remote communications device 24) via a sidelink 722 operating using either unlicensed spectrum or licensed spectrum, or a combination of both.

FIG. 4 shows a possible architecture for the provision of IAB. However, it will be appreciated that other architectures may be used and the present disclosure is not limited to a particular architecture.

Regulatory authorities may impose conditions on the use of any wireless communications equipment (such as infrastructure equipment and communications devices) of communication resources for transmission or reception, which may depend on the frequency band within which those communication resources occur.

These conditions may be technical (e.g. relating to transmission power) and/or non-technical (e.g. requiring a payment and/or a licence).

Conventional cellular communications networks operate using so-called 'licenced' spectrum, which may be allocated exclusively, for example by means of a licence, for the use of one or more network operator(s). An operator of such a network may permit a communications device to transmit and receive using this spectrum subject, for example, to payment of a subscription in respect of the communications device or the existence of a roaming agreement with another operator covering the communications device. Accordingly, because the use of the spectrum is under the control of the operator(s), such spectrum may also be referred to as 'operator managed' spectrum. Some licensed spectrum may also be referred to as 'non-operator managed' in scenarios where a conventional cellular network infrastructure is not used, for example in public safety deployments in out-of-coverage scenarios.

In contrast, wireless communication may take place using so-called 'unlicensed' spectrum, where no exclusive allocation occurs. This does not preclude the applicability of certain technical conditions or requirements on the equipment or its operation, but can allow users to deploy devices without any a priori arrangement (such as a subscription) with an operator. Examples of unlicensed spectrum include the Industrial, Scientific and Medical (ISM) bands, within which devices can communicate using wireless access interfaces such as Bluetooth®, and IEEE 802.11/WiFi®.

Many communications devices are capable of transmitting using both unlicensed and licensed spectrum, and device-to-device communication may, in general, use a wireless access interface which uses licensed or unlicensed spectrum.

An example of resource allocation for sidelink communications is given in [5]:

"In the context of group-based SL communication, it supported for [relay UE] UE-A to inform its serving gNB about members [remote UEs] UE-B, UE-C, and so on of a group, and for the gNB to provide individual resource pool configurations and/or individual resource configurations to each group member through UE-A. UE-A cannot modify the configurations, and there is no direct connection required between any [remote UE] and the gNB. Higher-layer only signalling is used to provide the configurations. Such functionality is up to UE capability(ies)."

However, such a principle of resource allocation may have drawbacks or otherwise be unsuitable, particularly when sidelink communication uses (or may use) unlicensed spectrum. In the example of FIG. 3, the remote communication device and the relay communications device both support (that is, are configurable to operate using) wireless access interfaces using licensed and unlicensed spectrum. In some example embodiments, they may support a sidelink using licensed spectrum which is based on a 3GPP NR wireless access interface and may provide a 3GPP 5G PC5 interface. In some example embodiments, they may support a sidelink using unlicensed spectrum which is based on an IEEE 802.11 wireless access interface or is based on a 3GPP NR wireless access interface which provides a sidelink using unlicensed spectrum.

For various reasons, it may be preferable for sidelink communications in such a scenario, and others, to not be fully under the control of an infrastructure equipment (such as the first infrastructure equipment 111 of FIG. 4), unlike conventional cellular wireless communications between a communications device and an infrastructure equipment. Nevertheless, the operator of the infrastructure equipment may desire that certain sidelink communication occurs in accordance with particular rules or policies. In particular, such a rule may require the sidelink to use only unlicensed spectrum, for example to avoid or reduce congestion or interference in the licensed spectrum. Such rules or policies may be based on a subscription applicable to the remote communications device, and/or based on a quality of service requirement for data to be transmitted via the sidelink.

There is thus a need to ensure that network operators can enforce rules and policies in respect of sidelink communications. In particular, there is a need for a technical solution to allow a network operator to control the use of licenced spectrum for the use of sidelink communications.

According to a first aspect of the present disclosure, there is provided a method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that the communications device is not permitted to transmit the data on a sidelink using communication resources of the first frequency range, determining that the communications device is permitted to transmit the data on a sidelink using communication resources of the second frequency range, and transmitting or receiving data on a sidelink using communication resources of the second frequency range.

Embodiments of the present technique can therefore ensure that a communications device uses unlicensed spectrum for sidelink communications, if it is capable of using, but is not permitted to use, licensed spectrum for the sidelink communications.

According to embodiments of the present technique, permissions for a communications device (which may be a relay communications device or a remote communications device) to communicate via a sidelink using unlicensed and licensed spectrum may be determined. In some embodiments, the permissions may be indicated by provisioning.

In some embodiments of the present technique, at least some aspect of the selection of communication resources for a sidelink transmission is controlled by the relay communications device (or 'master UE').

Embodiments of the present technique thus do not require the cellular radio access network (e.g. a 5G gNB) to allocate communication resources for individual sidelink transmissions (or even to allocate communication resources for a particular sidelink), while allowing policies or other rules to be applied to such sidelink transmissions.

Embodiments of the present technique can thus permit some or all resource allocation determinations to be made by the relay UE, and can avoid a need for another entity (such as the TRP 10 of FIG. 3, or any entity other than the relay UE and remote UE) to make some or all such determinations. In particular, this may be beneficial where the other entity is not configured to operate using unlicensed spectrum, and thus is unable to determine directly (e.g. by measurement) the suitability of communication resources in unlicensed spectrum for sidelink transmissions.

This may also be beneficial where, even when the other entity is configured to operate using unlicensed spectrum, it may not be able to carry out measurements which are suitable for basing resource allocation decisions on. For example, the 'hidden node' problem may arise, whereby transmissions which may have an impact on (e.g. by causing interference to) sidelink transmissions cannot be accurately measured by the other entity. Such hidden node problems may arise in particular in respect of transmission using unlicensed spectrum.

In other words, the transmit power and/or path loss applicable to unlicensed spectrum transmissions by or near to the remote or relay UEs (such as within or near to a PIoT network) may be such that the other entity (e.g. the cellular radio access network) would not be able to perform measurements that would be suitable for determining the suitability of communication resources in unlicensed spectrum for sidelink transmissions.

Figure 5:
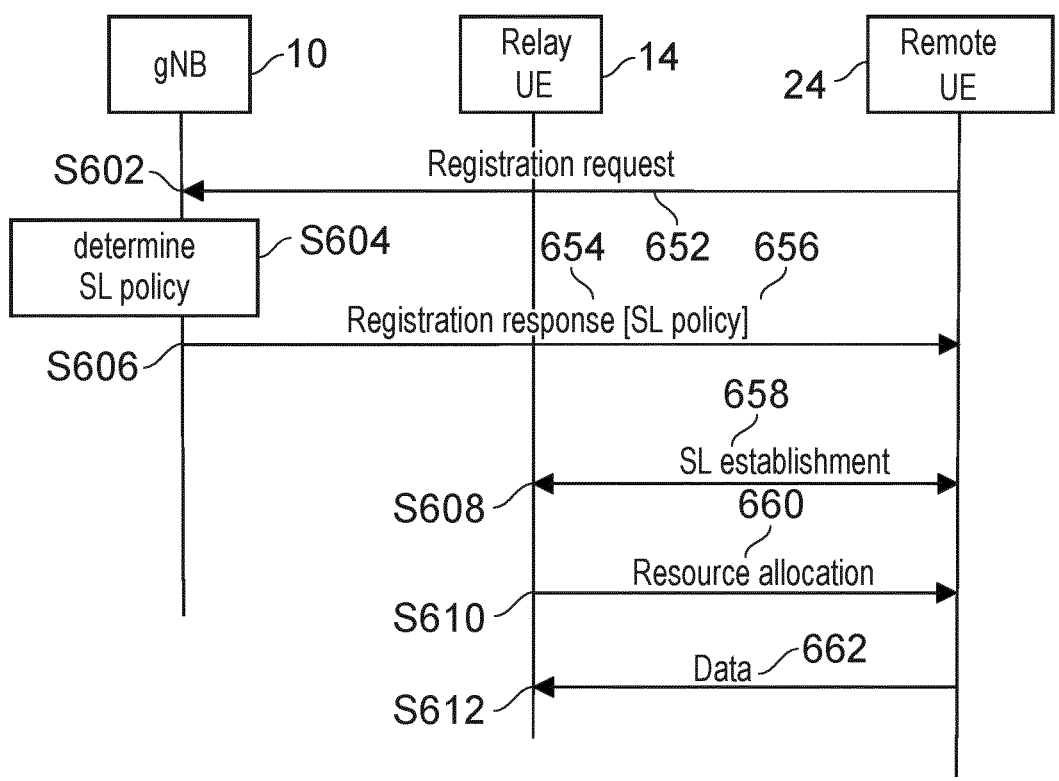
FIG. 5 is a combined process and message sequence chart for determining by a remote communications device of a policy for sidelink transmissions, in accordance with embodiments of the present technique.

FIG. 5 is a combined process and message sequence chart for determining, by a remote communications device, a policy for sidelink transmissions in accordance with embodiments of the present technique.

In some embodiments, the remote communications device 24 may determine a policy for a sidelink based on a provisioning of the remote communications device 24. Provisioning may comprise a configuration of the remote communications device 24 by storing, in non-volatile memory, a policy indication. The storing may occur prior to sale of the communications device to an end-user, for example as part of a manufacturing step, or as part of a pre-sale configuration process. In some embodiments, the provisioning may be in accordance with conventional techniques for provisioning radio parameters for a sidelink (such as a vehicle-to-X communication using a PC5 reference point [3]).

Accordingly, in some embodiments, the remote communications device 24 may determine a policy for a sidelink based on the policy indication stored in its non-volatile memory.

In some embodiments, the remote communications device 24 may determine a policy for a sidelink by receiving an indication of the policy via a wireless access interface. The indication of the policy may be transmitted by an infrastructure equipment (such as the infrastructure equipment 10 of FIG. 3 or the CU 40 of FIG. 4) or by a relay communications device (such as the relay communications device 14).

In some embodiments, an indication of the policy is transmitted by a core network element, either directly to the remote communications device 24, or via an infrastructure equipment (such as the infrastructure equipment 10 of FIG. 3, or the CU 40 of FIG. 4) within a radio access network.

The policy may be based on a subscription associated with the communications device, a policy associated with the radio access network, a policy associated with the wireless communications network (e.g. based on a public land mobile network, PLMN, identity) or a combination of these.

In some embodiments, the remote communications device 24 may determine whether the policy indication is stored in its non-volatile memory, and if it determines that it is not, may obtain the policy for the sidelink via a wireless access interface.

FIG. 5 illustrates an example of obtaining the policy for the sidelink via a wireless access interface.

Initially, the remote communications device 24 is within communication range of the infrastructure equipment 10 and the relay communications device 14.

At step S602, the remote communications device 24 transmits (either directly, or via the relay communications device 14) a registration request 652 to the infrastructure equipment 10. The registration request 652 comprises a request for a sidelink policy.

At step S604, in response to receiving the registration request 652, the infrastructure equipment 10 determines the sidelink policy applicable to the remote communications device 24. This may be based on a subscription associated with the remote communications device 24.

At step S606, the infrastructure equipment 10 transmits (either directly, or via the relay communications device 14) a registration response 654 comprising an indication of the sidelink policy 656. The sidelink policy 656 may indicate that, irrespective of the capabilities of the remote communications device 24, sidelink communications using one or more frequency bands is prohibited. In some embodiments, the remote communications device 24 may support transmission and reception of signals via communication resources within a frequency band which, according to the sidelink policy 656, is not permitted for use for sidelink communications by the remote communications device 24. In some embodiments, the remote communications device 24 may support transmission and reception of signals via communication resources within an unlicensed frequency band and within a licensed frequency band. In some such embodiments, according to the sidelink policy 656, the communications device 24 is not permitted to transmit or receive signals on a sidelink, using one of the licensed frequency band and the unlicensed frequency band.

The registration request 652 and registration response 654 may also perform (or comprise a portion of a procedure for performing) one or more of authentication and authorisation for the remote communications device 24. In some embodiments, the authorisation may be specifically for establishing a sidelink. In some embodiments, the authorisation may be specifically for establishing a sidelink with the relay communications device 14.

At step S608, the remote communications device 24 performs a sidelink establishment 658 with the relay communications device 14. The sidelink establishment may be in accordance with (or substantially based on) conventional techniques. For example, the sidelink may be established in accordance with IEEE 802.11 specifications for association, or in accordance with 3GPP specifications for the establishment of a PC5 interface.

As part of the sidelink establishment 658, the remote communications device 24 may transmit an indication of the sidelink policy 656 (or a portion thereof) to the relay communications device 14.

At step S610, the relay communications device 14 may allocate communication resources by means of a resource allocation 660, for the use of the remote communications device 24 for transmission of data. The resource allocation may be determined based on the sidelink policy 656 (or portion thereof).

In some embodiments, the resource allocation 660 may be based on an indication (not shown) of a pool of resources transmitted by the infrastructure equipment 10 to the relay communications device 14. The pool of resources may be for the use solely for transmissions between the relay communications device 14 and the remote communications device 24, or may be for transmissions between the relay communications device 14 and one or more remote communications devices (including the remote communications device 24).

Additionally or alternatively, in some embodiments, the remote communications device 24 may select communication resources for the transmission of the data, in compliance with the sidelink policy 656. For example, in some embodiments, as described above, the resource allocation 660 may indicate a pool of resources from which the remote communications device 24 may select resources for the transmission of data.

In some embodiments (for example, where the resources are in unlicensed spectrum), the selection of the resources may be performed entirely by the remote communications device 24, for example in accordance with a listen-before-talk (LBT) scheme.

The selected (or allocated) resources are compliant with the sidelink policy 656. Specifically, for example, they do not comprise resources which are within a frequency range which is prohibited for the use by the remote communications device 24 for sidelink communications.

At step S612, the remote communications device 24 transmits the data 662 using the selected (or allocated) communication resources.

An example of a sidelink policy in accordance with embodiments of the present technique is shown in Table 1. In general, a sidelink policy may indicate, for each of one or more frequency ranges, whether the remote communications device 24 is permitted to transmit or receive data via a sidelink, where the transmission or reception of the data uses communication resources within the frequency range.

In some embodiments, the one or more frequency ranges includes at least one range of unlicensed frequencies. In some embodiments, the one or more frequency ranges includes at least one range of licensed frequencies.

TABLE 1

Example Sidelink Policy

| Frequency range | Licensed or Unlicensed | Permitted to be used for sidelink? |
| --- | --- | --- |
| FDD: Uplink: 1710-1785 MHz Downlink: 1805-1880 MHz | Licensed | Yes |
| TDD: 5150-5925 MHz | Unlicensed | Yes |
| All others | | No |

In some embodiments, the sidelink policy may omit frequency ranges which are not permitted to be used for a sidelink. In some embodiments the sidelink policy may omit frequency ranges which are permitted to be used for a sidelink.

In some embodiments, a default may exist separately for licensed and unlicensed frequency ranges. For example, unless explicitly indicated by the sidelink policy, all licensed frequency ranges may be prohibited for sidelink communications, and all unlicensed frequency ranges may be permitted for sidelink communications.

Accordingly, although the remote communications device 14 may be capable (or configurable) of operating using a number of different frequency ranges, a policy may restrict the permitted frequency ranges.

The sidelink policy may depend on the subscription and service requirements. The sidelink policy may prohibit use of any licensed band if a corresponding subscription corresponds to unlicensed band sidelink operation only.

Additionally or alternatively, for example, a remote device using high data rate or high QoS may be permitted to use a licensed band for sidelink connection to/from a Master UE. A remote device using a low data rate or the best effort traffic may use only an unlicensed band. An operator may charge a first price for a subscription according to which a licensed band is permitted to be used and a second, lower, price for a subscription according to which only an unlicensed band sidelink operation is permitted. A remote device may be pre-configured (or provisioned) with the corresponding permitted radio frequency bands based on the subscription associated with the remote device.

It will be appreciated that different policies may apply simultaneously to different data transmitted by or to the same remote communications device. Similarly, different policies may apply to different remote communications devices having a common relay communications device.

In the example of FIG. 5, the remote communications device 24 determines the sidelink policy applicable to the sidelink for communications with the relay communications device 14.

In some embodiments, the relay communications device 14 determines the sidelink policy applicable to the sidelink for communications with the remote communications device 24. This may be by means of provisioning or based on an indication received from the infrastructure equipment 10. In some embodiments (as in the example of FIG. 5), the relay communications device 14 receives an indication of the sidelink policy 636 from the remote communications device 24.

In some embodiments, the relay communications device 14 determines the sidelink policy applicable to the sidelink for communications with the remote communications device 24 and subsequently transmits an indication of the policy to the remote communications device 24.

In some embodiments, the sidelink policy may be applicable only to the sidelink between the remote communications device 24 and the relay communications device 14. In some embodiments, the sidelink policy may be applicable to any sidelink involving the relay communications device 14.

In some embodiments, the communication resources for the sidelink are selected based on both a sidelink policy applicable specifically to the remote communications device 24 and a sidelink policy applicable more broadly (for example, to all sidelinks involving the relay communications device 14). In particular, for example, the communication resources for the sidelink are selected such that they are permitted according to both such policies.

Accordingly, embodiments of the present technique can restrict the use of communication resources (such as within licensed frequency bands) for sidelink communications. In particular, embodiment of the present technique can avoid the need for the infrastructure equipment to allocate resources for specific sidelink communications or for specific sidelinks, thus allowing a more flexible and response resource allocation by the remote communications device or by the relay communications device.

However, the infrastructure equipment 10 may, conventionally, may have no means to directly determine which communication resources (and thus which frequency band(s)) are being used for the sidelink. In particular, path loss between the remote device and the infrastructure equipment, and/or the transmission power on the sidelink, may be such that the infrastructure equipment is not capable of detecting sidelink transmissions. Alternatively, the infrastructure equipment may not be configured to operate using a frequency band which is being used for the sidelink communications.

In addition, data transmitted via the sidelink may terminate at the remote or relay communications devices. For example, in an IoT-type network, the Master/Relay UE may function as an IoT gateway, which collects data from nodes associated with remote UEs. The Master/Relay UE may not forward such data to the infrastructure equipment. Accordingly, the infrastructure equipment may not be able to determine an extent of sidelink communications.

The above issues may mean in particular that the infrastructure equipment is unable to verify that communications using a sidelink are using appropriate (e.g. permitted) communication resources.

There is therefore a need to permit an infrastructure equipment to obtain information regarding the use of sidelink communications, such as the nature (e.g. frequency ranges) of the communication resources used.

Embodiments of the present technique can provide a method of operating a relay communications device, the relay communications device configured to communicate with a remote communications device via a sidelink, the method comprising transmitting, to an infrastructure equipment, a sidelink usage report indicating a usage of the sidelink.

Figure 6:
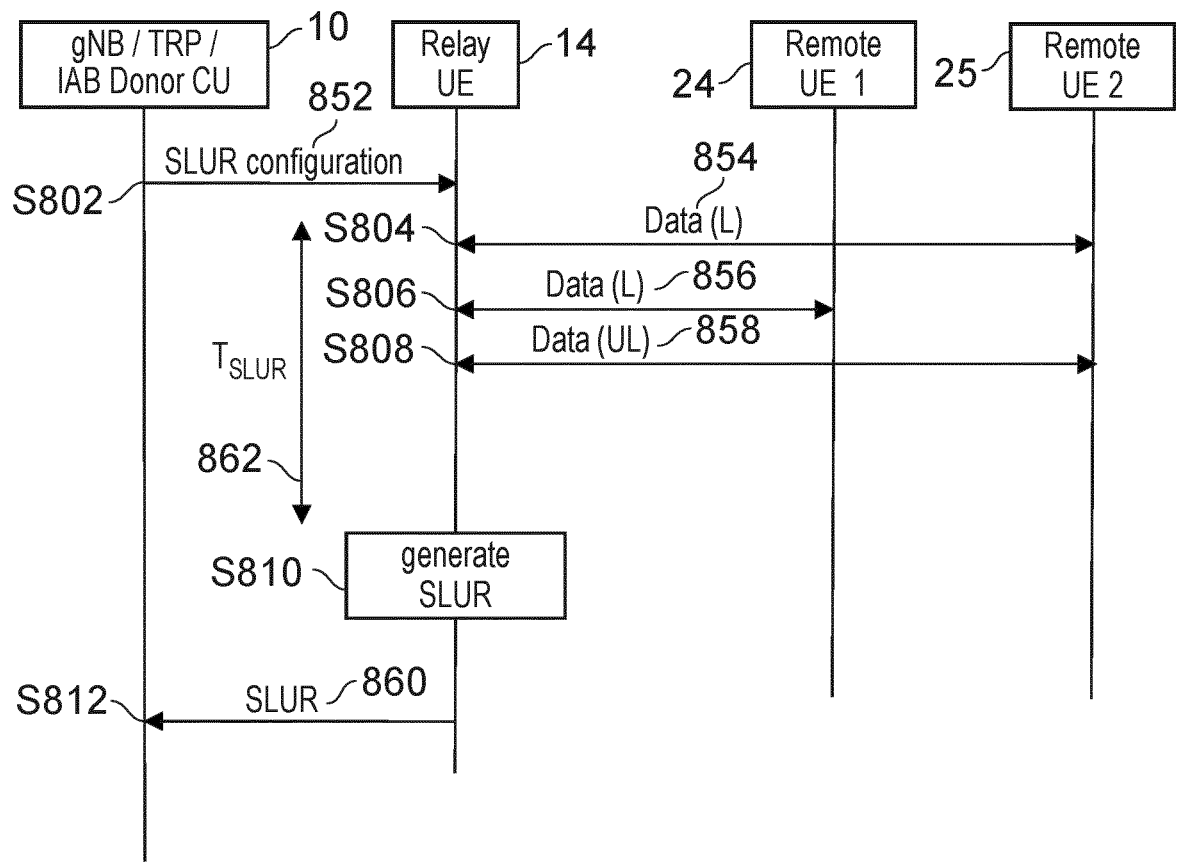
FIG. 6 is a combined process and message sequence chart for the transmission of a sidelink usage report in accordance with embodiments of the present technique.

FIG. 6 is a combined process and message sequence chart for the transmission of a sidelink usage report in accordance with embodiments of the present technique.

In the example of FIG. 6, a relay communications device 14 (which may be the IAB node 14 of FIG. 4 or the master UE 14 of FIG. 3) communicates with first and second remote communications devices 24, 25 via respective sidelinks.

The relay communications device 14 is also connected to an infrastructure equipment 10 (which may be a TRP 10, base station, gNB, or an IAB donor comprising a CU entity).

Initially, at step S802, the infrastructure equipment 10 transmits a sidelink usage report (SLUR) configuration 852 to the relay communications device 14. The SLUR configuration 852 may comprise one or more of
- an indication of the nature of information to be reported in a sidelink usage report,
- frequency bands which are to be within the scope of the sidelink usage report,
- remote communications devices which are to be within the scope of the sidelink usage report, and
- one or more time periods which are to be covered by respective sidelink usage reports.

In some embodiments, a step in the process illustrated in FIG. 6 may be initiated in response to a step or message in the process/sequence illustrated in FIG. 5. For example, step S802 may be carried out in response to step S602 (registration request) of the process of FIG. 5.

In some embodiments, one or more parameters specifying the nature of a sidelink usage report may be determined directly by the relay communications device 14, for example based on standards specifications.

In the example of FIG. 6, in accordance with the SLUR configuration 852, the sidelink usage report is to comprise information regarding sidelink transmissions during a time period 862 having duration $T_{SLUR}$ to or from all remote communications devices which have a sidelink with the relay communications device 14, i.e. the first and second remote communications device 24, 25.

During the time period 862, data may be transmitted between the relay communications device 14 and the remote communications devices 24, 25. Data transmission may be in either direction (to or from the relay communications device 14).

In the example of FIG. 6, first data transmission 854 occurs at step S804 between the relay communications device 14 and the second remote communications device 25. The first data transmission 854 uses communication resources in a licensed spectrum band (and hence is denoted by '(L)' in FIG. 6).

At step S806, second data transmission 856 occurs between the relay communications device 14 and the first remote communications device 24. The second data transmission 856 also uses communication resources in a licensed spectrum band.

At step S808, third data transmission 858 occurs between the relay communications device 14 and the second remote communications device 25. The third data transmission 858 uses communication resources in an unlicensed spectrum band (and hence is denoted by '(UL)' in FIG. 6).

After the time period $T_{SLUR}$, at step S810, the relay communications device 14 generates the sidelink usage report 860, which is transmitted to the infrastructure equipment 10 at step S812.

In some embodiments, the time period may repeat, and a sidelink usage report in respect of each successive time period may be generated and transmitted to the infrastructure equipment 10 by the relay communications device 14. For example, a second time period may begin immediately at the end of the time period 862 shown in FIG. 6.

The duration and periodicity of the time periods may be indicated by the sidelink usage report configuration 852.

In some embodiments, the sidelink usage report 860 and/or sidelink usage report configuration 852 may be in accordance with a conventional mechanism for layer 2 measurements performed in respect of a 3GPP LTE radio access network, as specified for example in 3GPP TS 36.314 [4], which are collected at the eNB and further reported to a server or apparatus providing an operations and management (OAM) function. For example, in some embodiments, the sidelink usage report is generated at the master UE/IAB-DU and reported to the gNB/CU which may further forward these to one or both of an OAM function or a charging function.

In the example of FIG. 6, data transmitted by the remote UEs 24, 25 terminates at the relay UE 14, and data transmitted by the relay UE towards the remote UEs 24, 25 originates at the relay UE 14. However, the present disclosure is not so limited, and in some embodiments, some or all data transmitted via a sidelink may originate at, or terminate at, a different node (such as a node reachable via a core network).

The sidelink usage report may comprise indications of one or more of the following measurements, in respect of the time period:
- a number of active remote communications devices (where an active remote communications device is one where data is transmitted to or by the device during the time period)
- a number of active remote communications devices
- an identity of one or more active remote communications devices
- an application used by a remote communications device associated with data transmitted via a sidelink
- a Total Resource allocation (for all remote communications devices)
- a resource allocation (for each remote communications device)

a number of PDCP PDUs exchanged a congestion ratio

QoS measurements: SL can change the priority of packets and collection of measurements per QoS class or priority Channel busy ratio (CBR) is measured over RSRP/RSRQ/RSSI Channel usage ratio (CR): a measurement of how much resource a UE has recently a measurement of interference congestion.

The measurements may be made by the relay communications device. In some embodiments, some measurements are made by the remote communications device, and an indication of those measurements is transmitted to the relay communications device. Accordingly, the sidelink usage report may be based on measurements made by the relay communications device, the remote communications device, or both.

In some embodiments, resource allocations for a particular sidelink, for a particular service, or for all sidelinks associated with a relay communications device may be changed from using a first frequency band (e.g. an unlicensed frequency band) to a second frequency band (e.g. a licensed frequency band).

Such a change may be in response to determining that one or more of the above measurements satisfy pre-determined criteria.

The change in resource allocation may be carried out at the relay communications device 14.

An indication of the pre-determined criteria may be transmitted from the infrastructure equipment 10 to the relay communications device 14.

For example, the infrastructure equipment 10 may transmit a frequency switch condition indication to the relay communications device 14 indicating that if a number of active remote communications devices exceeds 5, then resource allocations are to be changed for sidelink transmissions for one or more (e.g. the number greater than 5) of the remote communications devices from an unlicensed frequency band to a licensed frequency band.

In some embodiments, the change in resource allocation may be contrary to a sidelink policy.

Accordingly, embodiments of the present technique can provide for dynamic adaptation of resource allocation, based on local measurements by one or more of the remote communications device and the relay communications device.

Individual bands may correspond to those defined by a suitable standards organisation or international agreement. For example, bands may be those defined by 3GPP in [6].

In some embodiments, as described elsewhere herein, frequency bands may be grouped into those for which no licence is required, and those where a licence is required (the latter including operator-controlled frequency bands). In some embodiments, frequency bands may be grouped according to whether or not they are within the scope of a particular standard. For example, a first group may correspond to those frequency bands which are defined by 3GPP in [6], and a second group may correspond to frequency bands which are not defined in [6]. The sidelink usage report may thus group usage of communication resources according to which group of frequency bands the communication resources are within.

The sidelink usage report configuration 852 may indicate which of the above indications are required to be included in the sidelink usage report 860. For example, the sidelink usage report configuration 852 may indicate whether measurements are to be in respect of one or more specific frequency bands, or whether they may be aggregated (e.g. such that a single indication refers to all unlicensed bands or all licensed bands).

Criteria for including one or more of these indications may be configured by means of the sidelink usage report configuration 852.

Accordingly, at step S810, the relay communications device 14 may generate the sidelink usage report 860 in accordance with the sidelink usage report configuration 852.

As an example, the sidelink usage report 860 of FIG. 6 may comprise the following information:

that one remote communications device (second remote communications device 25) was active during the time period 862 in an unlicensed band;

that two remote communications devices (first and second remote communications devices 24, 25) was active during the time period 862 in a licensed band;

a number of PDCP PDUs transmitted to/by the first remote communications device 24 using an unlicensed band (i.e. zero)

a number of PDCP PDUs transmitted to/by the first remote communications device 24 using a licensed band (i.e. the quantity corresponding to second data transmission 856);

a number of PDCP PDUs transmitted to/by the second remote communications device 24 using an unlicensed band (i.e. the quantity corresponding to third data transmission 858); and a number of PDCP PDUs transmitted to/by the first remote communications device 24 using a licensed band (i.e. the quantity corresponding to first data transmission 854).

In some embodiments, some or all of the sidelink usage report 860 may be forwarded within the communication network. For example, some or all of the sidelink usage report 860 may be forwarded to a server or apparatus providing a charging function, which may adjust a usage amount or charge associated with a subscription corresponding to one or more of the remote communications devices 24, 25.

In response to receiving the sidelink usage report 860, the infrastructure equipment 10 may determine that a sidelink policy has been violated (and, where applicable, resource usage has not been compliant with pre-determined conditions for a change in resource allocation). In response to such a determination, the infrastructure equipment and/or other communication network entities may carry out one or more of:

releasing an RRC connection to the relay communications device;

releasing a connection terminating at the remote communications device, or commanding the relay communications device to release such a connection;

performing a detach procedure in respect of one or both of the relay communications device and the remote communications device;

generate a message and transmit the message to a public safety authority, regulatory authority or government agency indicating that the sidelink policy had been violated. The message may comprise an identifier associated with the remote communications device or a subscriber associated with the remote communications device;

modify a charging policy associated with the remote communications device generate or modify a billing record terminate, disable, or modify a subscription associated with the subscriber associated with the remote communications device; the subscription may be associated with multiple remote communications devices sharing a common relay communications device. In some embodiments, a subscription associated with an entire PIoT network may be terminated, disabled or modified.

Accordingly, infrastructure equipment of a wireless communications network is able to determine a usage of sidelinks, which may include the usage of communication resources in licensed and/or unlicensed frequency ranges. Accordingly, compliance with a sidelink policy associated with a remote communications device may be assessed. In particular, embodiments of the present technique may allow the infrastructure equipment to determine whether (and/or to what extent) a particular remote communications device is using, for sidelink transmissions, licensed or unlicensed spectrum.

This usage may be determined by a 5G CU even if the relay communications device is an IAB node and sidelink traffic terminates locally between the IAB DU (of the relay communications device) and a remote communications device.

In accordance with some embodiments of the present technique, the sidelink usage report may provide an indication of data transmissions associated with a particular application, and may indicate whether such transmissions were using licensed spectrum, unlicensed spectrum, or both, and may thus permit the infrastructure equipment to determine whether policies which are application-specific are being complied with.

The infrastructure equipment (and/or other network equipment) may perform various operations in response to determining that a policy has not been complied with, thus providing an incentive to subscribers to ensure that a communications device complies with any applicable sidelink policy.

In some embodiments, the relay communications device 14 may have a non-access stratum connection terminating in the core network of the wireless communications network, for example, with an access and mobility management function (AMF). In some embodiments, a NAS entity (e.g. an AMF) may transmit a request for a sidelink usage report to the relay communications device 14. In response, the relay communications device 14 may generate and transmit a sidelink usage report to the NAS entity. This may be in addition to, or instead of, the transmission of a sidelink usage report to an infrastructure equipment 10 within the radio access network (such as the IAB CU 40 of FIG. 4).

Accordingly, embodiments of the present technique can provide for the provision of sidelink usage information to a NAS entity, and may avoid processing by a radio access network entity of subscription 10 or charging details.

In the examples shown in FIG. 5 and FIG. 6, all communication by a remote communications device 24, 25 is via a sidelink with a relay communications device 14. However, in some embodiments, remote communications devices may communicate directly between themselves. Resource allocations and/or selections for such transmissions may be made by a remote communications device (e.g. the transmitting device) or by the relay communications device 14.

In such embodiments, for a link between two remote communications devices (not involving the relay communications device) then in some embodiments, the relay communications device may use a sensing mechanism (e.g. by measuring a received power level) to determine the used communication resources.

In some embodiments, where the resource allocation for transmissions between remote communications devices are made by the relay communications device 14, a remote communications device may transit an indication to the relay communications device to indicate that it is unable to use the allocated communications resource.

Accordingly, embodiments of the present technique can permit an infrastructure equipment or core network entity or function to determine whether communication resources being used for a sidelink communication are compliant with a sidelink policy.

Security Keys

Conventionally, data is secured (for confidentiality and/or integrity purposes) using one or more security keys. The keys may be known to a communications device and to an entity in the network.

In accordance with some embodiments of the present technique, one of a plurality of keys is selected for securing data, depending on the frequency range used for the transmission of the data. For example, a first set of keys (which may comprise one or more of an encryption key and an integrity key) may be used only for data transmitted using licensed spectrum (or a subset thereof), and a second set of keys may be used only for data transmitted using unlicensed spectrum (or a subset thereof). The keys may be used for securing the data when transmitted via a sidelink. Accordingly, the encryption endpoints may be the remote communications device 24 and the relay communications device 14.

The derivation of the first set of keys may be in accordance with known techniques for key derivation for a sidelink, such as in accordance with specified techniques for deriving keys NRPEK and NRPIK for PC5 signalling [7]. For example, the keys NRPEK and NRPIK may be derived based on long term credentials, a KNRP key, and a KNRP-sess key where:

The long term credentials are provisioned into the UE(s) and form the root of the security of the PC5 unicast link. The credentials may include symmetric key(s) or public/private key pair depending on the particular use case. Authentication signalling is exchanged between the UEs to derive the KNRP.

KNRP is a 256-bit root key that is shared between the two entities that communicating using NR PC5 unicast link. It may be refreshed by re-running the authentication signalling using the long-term credentials. Nonces are exchanged between the UEs and used with the KNRP to generate a KNRP-sess (the next layer of keys). KNRP may be kept even when the UEs have no active unicast communication session between them. The KNRP ID is used to identify KNRP.

KNRP-sess is a 256-bit key that is derived by UE from KNRP and is used to protect the transfer of data between the UEs. The KNRP-sess is derived per unicast link During activated unicast communication session between the UEs, the KNRP-sess may be refreshed by running the rekeying procedure. NRPEK and NRPIK are used in the confidentiality and integrity algorithms and are derived directly from KNRP-sess. The 16-bit KNRP-sess ID identifies the KNRP-sess.

The derivation of each of the second set of keys may be based on one or more of a value (such as a counter) specifically for the purpose of generating an unlicensed sidelink key and a key of the first set (or precursor thereof).

For example, the second set of keys, for use for transmissions using an unlicensed band, may comprise keys NRPIK' and NRPEK' for integrity protection and encryption, respectively. The derivation of NRPIK' and NRPEK' may comprise an operation (e.g. XOR, AND, OR in combination with a known number or counter) carried out on NRPEK and NRPIK respectively.

The infrastructure equipment 10 may transmit an indication (e.g. as part of the sidelink policy) to the relay communications device 14 and remote communications device 24 to instruct the respective communications devices to derive the first and/or second set of keys, and to use them as described above. The value may be provided to the remote communications device by the relay communications device or by the infrastructure equipment 10. Accordingly, the relay communications device or infrastructure equipment may prevent the remote communications device from generating valid set of keys by from providing the value.

In some embodiments, the each of the first set of keys may be generated based on a value and/or a key in the second set of keys (or precursor thereof). The second set of keys may be generated in accordance with a known technique for generating sidelink keys, such as that described in [7].

In response, the relay communications device 14 generates the sets of keys as indicated. For example, data transmitted to (or received from) the remote communications device 24 using licensed spectrum is encrypted (or decrypted) using the encryption key of the first set of keys. Similarly, integrity protection for data transmitted to (or received from) the remote communications device 24 using licensed spectrum is applied or verified using the integrity protection key of the first set of keys.

In an example, data transmitted to (or received from) the remote communications device 24 using unlicensed spectrum is encrypted (or decrypted) using the encryption key of the second set of keys. Similarly, integrity protection for data transmitted to (or received from) the remote communications device 24 using unlicensed spectrum is applied or verified using the integrity protection key of the second set of keys.

In some embodiments, the remote communications device 24 is prevented from generating both sets of keys if, in accordance with the sidelink policy, the remote communications device 24 is not permitted to transmit data using a sidelink using both licensed and unlicensed spectrum. For example, a parameter required to generate the first set of keys may be transmitted to the remote communications device 24, by the relay communications device 14 or the infrastructure equipment 10 only if, according to the sidelink policy, the remote communications device 24 is permitted to transmit data via a sidelink using licensed spectrum.

Data is transmitted using licensed spectrum by a communications device which is not permitted to transmit using the licensed spectrum, and is not permitted to use the first set of keys if the communications device violates the sidelink policy. The communications device may apply a key or keys from the second set of keys to such data, which may then be transmitted using licensed spectrum (contrary to the sidelink policy). However, the peer communications device will attempt to decrypt (or verify the integrity of) the data using the first set of keys, because the data was transmitted using licensed spectrum, and will fail to decrypt or verify the integrity of such data. The data may then be discarded.

In some embodiments, the relay communications device 14 is a trusted device, such that it will comply with any sidelink policy which it becomes aware of, and will process transmitted and received data using appropriate security keys, depending on the frequency band used for transmission. Accordingly, embodiments of the present technique can prevent a remote communications device from effectively transmitting data while violating the sidelink policy.

Figure 7:
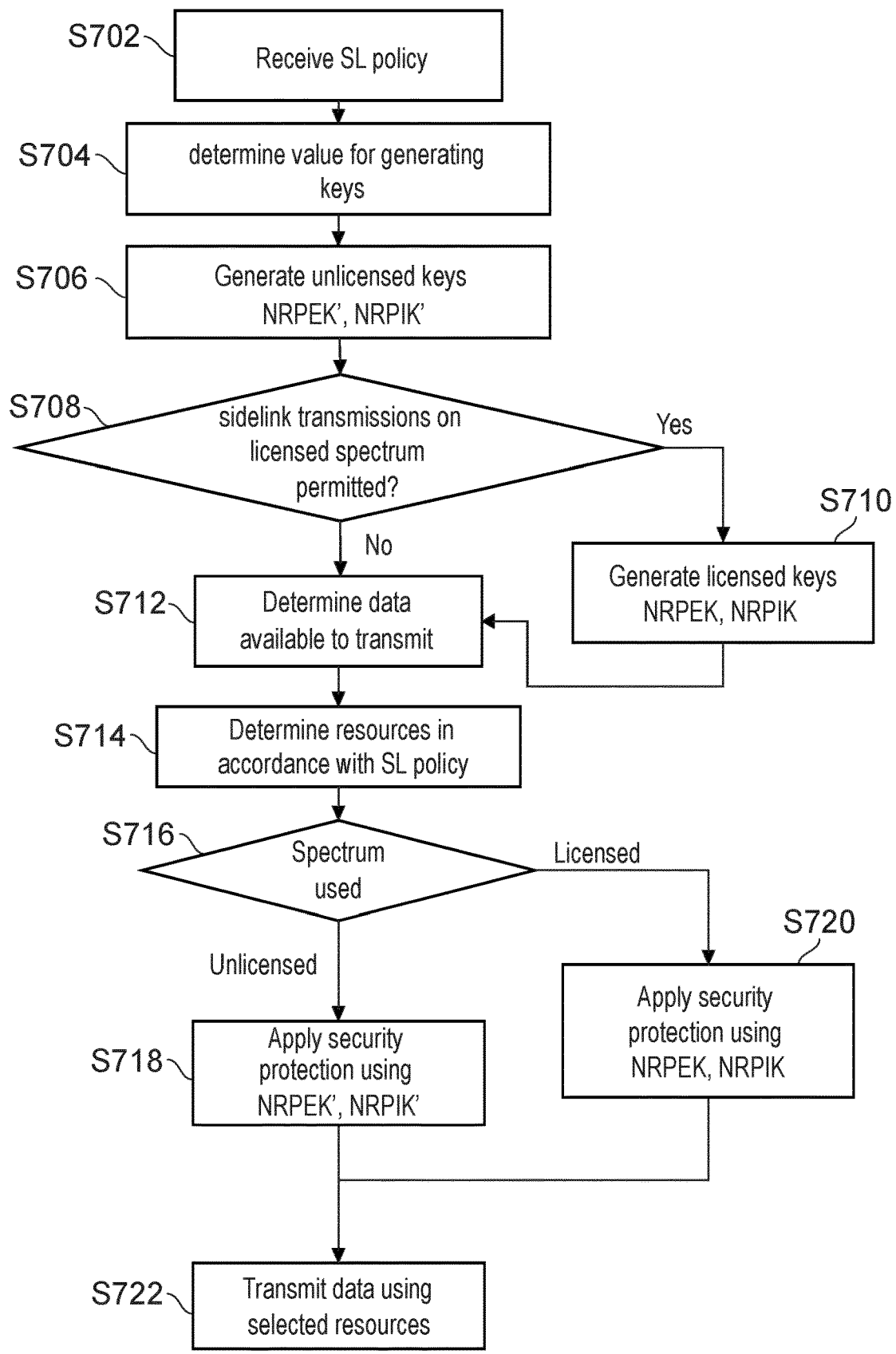
FIG. 7 is a process flow chart for a communications device for transmitting or receiving data via a sidelink in accordance with embodiments of the present technique.

FIG. 7 is a process flow chart for a communications device for transmitting data via a sidelink in accordance with embodiments of the present technique. The process may be carried out by the remote communications device 24, the relay communications device 14, or by both.

The process in FIG. 7 starts at step S702, in which the communications device receives the sidelink policy. This may be by means of any suitable technique, such as those disclosed herein. The process illustrated in FIG. 5 may be used for receiving the sidelink policy.

At step S704, the communications device determines one or more values (parameters) for generating security keys. In particular, where the sidelink policy permits both the use of both unlicensed and licensed spectrum, the parameters may permit the derivation of two sets of keys, one for data transmitted using licensed spectrum, and the other for data transmitted using unlicensed spectrum. In some embodiments, such as when the communications device is the relay communications device, the communications device determines the value(s) by determining a value of a counter maintained at the communications device.

In some embodiments (such as when the communications device is the remote communications device), the determining may comprise receiving an indication of the value(s), such as from the relay communications device or from the infrastructure equipment 10.

Similarly, in some embodiments, in an additional step (not shown) the communications device (when the communications device is the relay communications device 14) value(s) necessary for the derivation of the security keys, in accordance with the sidelink policy. In particular, the communications device may refrain from transmitting any value which is required only for generating a security key if that security key is for protecting data when transmitted via a sidelink using spectrum which is not permitted according to the sidelink policy.

In some embodiments, the transmitted/received values may be the key(s) themselves. In such a case, if the communications device receives the keys, then steps S706, S708, and S710 may be omitted and control may pass directly to step S712.

At step S706, the communications device generates the second set of keys (for unlicensed spectrum transmissions). These may be generated in accordance with conventional sidelink key generation techniques.

At step S708, the communications device determines whether, according to the sidelink policy received at step S702, it is permitted to transmit using licensed spectrum. If it is ('Yes'), then control passes to step S710. Otherwise ('No'), control passes to step S712.

At step S710, the communications device derives the first set of keys (for licensed spectrum transmissions). This may be based on the second set of keys and/or the value(s) received at step S704. After step S710, control passes to step S712.

At step S712, the communications device determines that data is available for transmission. This may be based on a request from an application or higher protocol layer to transmit the data.

At step S714, the communications device determines communication resources to be used for transmitting the data. This may be by autonomous selection (if the communications device is responsible for selecting the communication resources) or may comprise receiving an indication of resources from a peer communications device or an infrastructure equipment. The communication resources are selected in accordance with the sidelink policy received at step S702.

At step S716, the communications device determines whether the resources identified in step S714 use licensed or unlicensed spectrum. If they use licensed spectrum, the control passes to step S720, otherwise, control passes to step S718.

In steps S718 and S720, the communications device applies security protection to the data using appropriate keys, corresponding to the type of spectrum identified at step S716. Specifically, at step S718 (respectively step S720) the communications device uses the second set (respectively, first set) of keys to secure the data. The security protection may comprise encryption and/or integrity protection.

After steps S718 and S720, control passes to step S722, where the security-protected data is transmitted using the communication resources identified at step S714.

A corresponding process may be applied at the peer communications device which receives the data transmitted at step S722. In particular, steps S702, S704, S706, S708, and S710 may be carried out at the peer communications device. In response to receiving data, the peer communications device may perform decryption and/or integrity using keys corresponding to the spectrum used for the transmission of the data.

The peer communications device which receives data transmitted using communication resources, and which is protected using a key which is not for the protection of data transmitted using those communication resources (but is, for example, for the protection of data transmitted using different communication resources) may determine that the transmitting communications device is violating the sidelink policy, and may subsequent inform another network entity (e.g. the infrastructure equipment 10). In some embodiments, the infrastructure equipment 10 or other network entity may carry out one or more steps as described elsewhere here in response to determining that the transmitting communications device is violating the sidelink policy.

As described above, in some embodiments, the value(s) for generating the keys may be transmitted by the infrastructure equipment 10. Accordingly, in some embodiments, the infrastructure equipment 10 may transmit the value(s) based on the sidelink policy.

Accordingly, embodiments of the present technique can enforce a sidelink policy by means of a corresponding key derivation procedure in which keys are only determined (derived) for transmissions on resources which the remote communications device is permitted to use. In some embodiments, the remote communications device is prevented from generating a key which is for protecting data transmitted via a sidelink using communication resources of a frequency range if, according to a sidelink policy, the transmission of the data via the sidelink using resources of that frequency range is not permitted.

Above have been given descriptions of example processes combining sequences of steps and messages in combination. The scope of the present disclosure is not, however, limited to such specific combinations and in some embodiments, various of the steps and messages described may be omitted, or combined in a different order, or modified. Features or steps described in the context of one example may be combined with features or steps described in the context of another example.

Thus there has been described a method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that the communications device is not permitted to transmit the data on a sidelink using communication resources of the first frequency range, determining that the communications device is permitted to transmit the data on a sidelink using communication resources of the second frequency range, and transmitting or receiving data on a sidelink using communication resources of the second frequency range.

There has also been disclosed a method or of operating a communications device, the method comprising determining that the communications device is not permitted to transmit data on a sidelink using communication resources of a first frequency range, the communications device being configurable to transmit or to receive data on the sidelink using communication resources of the first frequency range, determining that the communications device is permitted to transmit the data on a sidelink using communication resources of a second frequency range, the communications device being configurable to transmit or the receive the data on the sidelink using communication resources of the second frequency range, the first frequency range being a licensed frequency range, and the second frequency range being an unlicensed frequency range, and transmitting or receiving the data on the sidelink using communication resources of the second frequency range.

There has also been disclosed a method of operating a communications device, the communications device configured as a relay communications device to communicate with a remote communications device via a sidelink, the method comprising transmitting, to an infrastructure equipment, a sidelink usage report indicating a usage of the sidelink.

There has also been disclosed a method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, determining, based on the sidelink policy, whether the communications device is permitted to transmit data on a sidelink using communication resources of the first frequency range and only if the communications device is permitted to transmit data on a sidelink using communication resources of the first frequency range, transmitting to the communications device a first value for determining a first security key, the first security key for protecting data transmitted via the sidelink using communication resources of the first frequency range, and not for protecting data transmitted via the sidelink using communication resources of the second frequency range.

There has also been disclosed a method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, determining, based on the sidelink policy, whether the communications device is permitted to transmit data on a sidelink using communication resources of the first frequency range and only if the communications device is permitted to transmit data on a sidelink using communication resources of the first frequency range, determining a first security key, the first security key for protecting data transmitted via the sidelink using communication resources of the first frequency range, and not for protecting data transmitted via the sidelink using communication resources of the second frequency range.

There has also been disclosed a method for a relay communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that the communications device is not permitted to transmit the data on a sidelink using communication resources of the first frequency range, determining that the communications device is permitted to transmit the data on a sidelink using communication resources of the second frequency range, transmitting or receiving data on a sidelink using communication resources of the second frequency range, and transmitting, to an infrastructure equipment, a sidelink usage report indicating a usage of the sidelink.

There has also been disclosed a method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that in accordance with a sidelink policy the communications device is not permitted to transmit the data on a sidelink using communication resources of the first frequency range, determining that in accordance with the sidelink policy the communications device is permitted to transmit the data on a sidelink using communication resources of the second frequency range, and selecting communication resources for the transmission of data in accordance with the sidelink policy.

There has also been disclosed a method for an infrastructure equipment, the method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, receiving a sidelink usage report, the sidelink usage report indicating a usage of a sidelink between a remote communications device and a relay communications device, the communications device being one of the remote communications device and the relay communications device, and determining, based on the sidelink usage report, whether the communications device has violated the sidelink policy.

Corresponding apparatus and circuitry have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communications devices/IoT devices, but can be applied more generally, for example in respect of any type of sidelink providing a wireless link to a communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that the communications device is not permitted to transmit the data on a sidelink using communication resources of the first frequency range, determining that the communications device is permitted to transmit the data on a sidelink using communication resources of the second frequency range, and transmitting or receiving data on a sidelink using communication resources of the second frequency range.

Paragraph 2. A method according to paragraph 1, wherein determining that the communications device is not permitted to transmit the data on a sidelink using communication resources of the first frequency range comprises receiving from an infrastructure equipment an indication that the communications device is not permitted to transmit the data on a sidelink using communication resources of the first frequency range.

Paragraph 3. A method according to paragraph 1 or paragraph 2, wherein determining that the communications device is permitted to transmit the data on a sidelink using communication resources of the second frequency range comprises determining that the communications device is provisioned with information indicating that the communications device is permitted to transmit the data on a sidelink using communication resources of the second frequency range.

Paragraph 4. A method according to any of paragraphs 1 to 3, wherein determining that the communications device is not permitted to transmit the data on a sidelink using communication resources of the first frequency range comprises receiving an indication via a wireless access interface that the communications device is not permitted to transmit the data on a sidelink using communication resources of the first frequency range.

Paragraph 5. A method according to paragraph 4, wherein the wireless access interface is a sidelink wireless access interface.

Paragraph 6. A method according to any of paragraphs 1 to 5, wherein communications device is acting as a remote communications device.

Paragraph 7. A method according to paragraph 6, the method comprising receiving an indication of communication resources allocated for the transmission of data via a sidelink between the communications device and a communications device acting as a relay communications device, wherein transmitting or receiving the data on the sidelink comprises transmitting or receiving the data using the allocated communication resources.

Paragraph 8. A method according to any of paragraphs 1 to 5, wherein the communications device is acting as a relay communications device.

Paragraph 9. A method according to paragraph 8, the method comprising selecting communication resources for the transmission of data via a sidelink between the communications device and a second communications device acting as a remote communications device, wherein transmitting or receiving the data on the sidelink comprises transmitting or receiving the data using the selected communication resources.

Paragraph 10. A method according to paragraph 8 or paragraph 9, wherein transmitting or receiving the data on the sidelink using communication resources of the second frequency range comprises transmitting data to or receiving data from a remote communications device, and determining that the communications device is not permitted to transmit the data on a sidelink using communication resources of the first frequency range comprises determining that the remote communications device is not permitted to transmit on a sidelink using communication resources of the first frequency range.

Paragraph 11. A method according to any of paragraphs 8 to 10, wherein the communications device is connected to a core network of a communications network via a wireless backhaul.

Paragraph 12. A method of operating a communications device, the communications device configured as a relay communications device to communicate with a remote communications device via a sidelink, the method comprising transmitting, to an infrastructure equipment, a sidelink usage report indicating a usage of the sidelink.

Paragraph 13. A method according to paragraph 12, wherein the sidelink usage report comprises an indication of a number of remote communication devices communicating with the relay communications device via a sidelink and using communications resources of an unlicensed frequency range.

Paragraph 14. A method according to paragraph 12 or paragraph 13, wherein the sidelink usage report comprises an indication of a number of remote communication devices communicating with the relay communications device via a sidelink and using communications resources of a licensed frequency range.

Paragraph 15. A method according to any of paragraphs 12 to 14, wherein the sidelink usage report comprises an indication of communication resources allocated for remote communication devices to communicate with the relay communications device via a sidelink.

Paragraph 16. A method according to any of paragraphs 12 to 15, wherein the sidelink usage report comprises an indication of communication resources within a licensed frequency range allocated for remote communication devices to communicate with the relay communications device via a sidelink.

Paragraph 17. A method according to any of paragraphs 12 to 16, wherein the sidelink usage report comprises an indication of communication resources within an unlicensed frequency range allocated for remote communication devices to communicate with the relay communications device via a sidelink.

Paragraph 18. A method according to any of paragraphs 12 to 17, wherein the sidelink usage report corresponds to a period of time.

Paragraph 19. A method according to any of paragraphs 12 to 18, the method comprising receiving from the infrastructure equipment a sidelink usage report configuration, and generating the sidelink usage report based on the sidelink usage report configuration.

Paragraph 20. A method according to any of paragraphs 12 to 19, wherein the sidelink usage report is a non-access stratum (NAS) message.

Paragraph 21. A method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, determining, based on the sidelink policy, whether the communications device is permitted to transmit data on a sidelink using communication resources of the first frequency range and only if the communications device is permitted to transmit data on a sidelink using communication resources of the first frequency range, transmitting to the communications device a first value for determining a first security key, the first security key for protecting data transmitted via the sidelink using communication resources of the first frequency range, and not for protecting data transmitted via the sidelink using communication resources of the second frequency range.

Paragraph 22. A method according to paragraph 21, the method comprising determining, based on the sidelink policy, whether the communications device is permitted to transmit data on a sidelink using communication resources of the second frequency range and only if the communications device is permitted to transmit data on a sidelink using communication resources of the second frequency range, transmitting to the communications device a second value for determining a second security key, the second security key for protecting data transmitted via the sidelink using communication resources of the second frequency range, and not for protecting data transmitted via the sidelink using communication resources of the first frequency range.

Paragraph 23. A method according to paragraph 22, wherein the first security key and the second security key are derived from a common value Paragraph 24. A method according to any of paragraphs 21 to 23, wherein the value for determining the first security key is the first security key Paragraph 25. A method according to any of paragraphs 21 to 24, wherein the first security key is for encryption or integrity protection of the data Paragraph 26. A method according to any of paragraphs 21 to 25, wherein the communications device is a remote communications device.

Paragraph 27. A method according to any of paragraphs 21 to 26, wherein the method is carried out by a relay communications device.

Paragraph 28. A method according to paragraph 27, the method comprising receiving via a sidelink, data transmitted using the second frequency range, the data protected using the first security key, in response to receiving the data protected using the first security key, determining that the communications device is violating the sidelink policy and transmitting an indication that the communications device is violating the sidelink policy.

Paragraph 29. A method according to any of paragraphs 21 to 26, wherein the method is carried out by an infrastructure equipment.

Paragraph 30. A method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, determining, based on the sidelink policy, whether the communications device is permitted to transmit data on a sidelink using communication resources of the first frequency range and only if the communications device is permitted to transmit data on a sidelink using communication resources of the first frequency range, determining a first security key, the first security key for protecting data transmitted via the sidelink using communication resources of the first frequency range, and not for protecting data transmitted via the sidelink using communication resources of the second frequency range.

Paragraph 31. A method according to paragraph 30, the method comprising using the first security key, protecting data for transmission via the sidelink, and transmitting the data via the sidelink using communication resources of the first frequency range.

Paragraph 32. A method according to paragraph 30 or paragraph 31, the method comprising receiving an indication of a first value for determining the first security key.

Paragraph 33. A method according to paragraph 32, wherein the indication of the first value is transmitted by a relay communications device.

Paragraph 34. A method according to paragraph 32, wherein the indication of the first value is transmitted by an infrastructure equipment.

Paragraph 35. A method according to any of paragraphs 30 to 34, the method comprising determining, based on the sidelink policy, whether the communications device is permitted to transmit data on a sidelink using communication resources of the second frequency range and only if the communications device is permitted to transmit data on a sidelink using communication resources of the second frequency range, determining a second security key, the second security key for protecting data transmitted via the sidelink using communication resources of the second frequency range, and not for protecting data transmitted via the sidelink using communication resources of the first frequency range.

Paragraph 36. A method for a relay communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that the communications device is not permitted to transmit the data on a sidelink using communication resources of the first frequency range, determining that the communications device is permitted to transmit the data on a sidelink using communication resources of the second frequency range, transmitting or receiving data on a sidelink using communication resources of the second frequency range, and transmitting, to an infrastructure equipment, a sidelink usage report indicating a usage of the sidelink.

Paragraph 37. A method according to paragraph 36, the method comprising in response to determining that the communications device is permitted to transmit the data on a sidelink using communication resources of the second frequency range, determining a security key, the security key for protecting data transmitted via the sidelink using communication resources of the second frequency range, and not for protecting data transmitted via the sidelink using communication resources of the first frequency range, and using the security key, protecting data for transmission via the sidelink, and transmitting the data via the sidelink using communication resources of the second frequency range.

Paragraph 38. A method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising determining that in accordance with a sidelink policy the communications device is not permitted to transmit the data on a sidelink using communication resources of the first frequency range, determining that in accordance with the sidelink policy the communications device is permitted to transmit the data on a sidelink using communication resources of the second frequency range, and selecting communication resources for the transmission of data in accordance with the sidelink policy.

Paragraph 39. A method according to paragraph 38, wherein the communications device is acting as a relay communications device.

Paragraph 40. A method according to paragraph 39, the method comprising transmitting an indication of the selected communication resources to a remote communications device.

Paragraph 41. A method according to paragraph 40, wherein the sidelink policy is associated with the remote communications device.

Paragraph 42. A method for an infrastructure equipment, the method comprising determining a sidelink policy, the sidelink policy indicating whether a communications device is permitted to transmit data on a sidelink using communication resources of a first frequency range and whether the communications device is permitted to transmit data on a sidelink using communication resources of a second frequency range, receiving a sidelink usage report, the sidelink usage report indicating a usage of a sidelink between a remote communications device and a relay communications device, the communications device being one of the remote communications device and the relay communications device, and determining, based on the sidelink usage report, whether the communications device has violated the sidelink policy.

Paragraph 43. A method according to paragraph 42, the method comprising determining that the communications device has violated the sidelink policy.

Paragraph 44. A method according to paragraph 43, the method comprising in response to determining that the communications device has violated the sidelink policy, transmitting a release indication to the relay communications device, the release indication indicating that it is to release any connection with the communications device.

Paragraph 45. A communications device for operating in a wireless communications network, the communications device comprising a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range, a receiver configurable to receive data on a sidelink using communication resources of the first frequency range and configurable to receive data on a sidelink using communication resources of the second frequency range and a controller configured to control the transmitter and the receiver so that the communications device is operable to determine that the communications device is not permitted to transmit the data on a sidelink using communication resources of the first frequency range, to determine that the communications device is permitted to transmit the data on a sidelink using communication resources of the second frequency range, and to transmit or to receive data on a sidelink using communication resources of the second frequency range.

Paragraph 46. Circuitry for a communications device for operating in a wireless communications network, the circuitry comprising transmitter circuitry configurable to transmit data on a sidelink using communication resources of a first frequency range and configurable to transmit data on a sidelink using communication resources of a second frequency range, the first frequency range being a licensed frequency range, and the second frequency range being an unlicensed frequency range, receiver circuitry configurable to receive data on a sidelink using communication resources of the first frequency range and configurable to receive data on a sidelink using communication resources of the second frequency range and controller circuitry configured to control the transmitter circuitry and the receiver circuitry so that the communications device is operable to determine that the communications device is not permitted to transmit the data on a sidelink using communication resources of the first frequency range, to determine that the communications device is permitted to transmit the data on a sidelink using communication resources of the second frequency range, and to transmit or to receive data on a sidelink using communication resources of the second frequency range.

Paragraph 47. A communications device for operating in a wireless communications network, the communications device comprising a transmitter configurable to transmit signals to another communications device, a receiver configurable to receive signals from the other communications device and a controller configured to control the transmitter and the receiver so that the communications device is operable to determine a sidelink policy, the sidelink policy indicating whether the other communications device is permitted to transmit data on a sidelink using communication resources of a first frequency range and whether the other communications device is permitted to transmit data on a sidelink using communication resources of a second frequency range, to determine, based on the sidelink policy, whether the other communications device is permitted to transmit data on a sidelink using communication resources of the first frequency range and only if the other communications device is permitted to transmit data on a sidelink using communication resources of the first frequency range, to transmit to the other communications device a first value for determining a first security key, the first security key for protecting data transmitted via the sidelink using communication resources of the first frequency range, and not for protecting data transmitted via the sidelink using communication resources of the second frequency range.

Paragraph 48. Circuitry for a communications device for operating in a wireless communications network, the circuitry comprising transmitter circuitry configurable to transmit signals to another communications device, receiver circuitry configurable to receive signals from the other communications device and controller circuitry configured to control the transmitter circuitry and the receiver circuitry so that the communications device is operable to determine a sidelink policy, the sidelink policy indicating whether the other communications device is permitted to transmit data on a sidelink using communication resources of a first frequency range and whether the other communications device is permitted to transmit data on a sidelink using communication resources of a second frequency range, to determine, based on the sidelink policy, whether the other communications device is permitted to transmit data on a sidelink using communication resources of the first frequency range and only if the other communications device is permitted to transmit data on a sidelink using communication resources of the first frequency range, to transmit to the other communications device a first value for determining a first security key, the first security key for protecting data transmitted via the sidelink using communication resources of the first frequency range, and not for protecting data transmitted via the sidelink using communication resources of the second frequency range.

Paragraph 49. A communications device for operating in a wireless communications network, the communications device comprising a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range, a receiver configurable to receive data on a sidelink using communication resources of the first frequency range and configurable to receive data on a sidelink using communication resources of the second frequency range and a controller configured to control the transmitter and the receiver so that the communications device is operable to determine a sidelink policy, the sidelink policy indicating whether a communications device is permitted to transmit data on a sidelink using communication resources of a first frequency range and whether the communications device is permitted to transmit data on a sidelink using communication resources of a second frequency range, to determine, based on the sidelink policy, whether the communications device is permitted to transmit data on a sidelink using communication resources of the first frequency range and only if the communications device is permitted to transmit data on a sidelink using communication resources of the first frequency range, to determine a first security key, the first security key for protecting data transmitted via the sidelink using communication resources of the first frequency range, and not for protecting data transmitted via the sidelink using communication resources of the second frequency range.

Paragraph 50. Circuitry for a communications device for operating in a wireless communications network, the circuitry comprising transmitter circuitry configurable to transmit data on a sidelink using communication resources of a first frequency range and configurable to transmit data on a sidelink using communication resources of a second frequency range, the first frequency range being a licensed frequency range, and the second frequency range being an unlicensed frequency range, receiver circuitry configurable to receive data on a sidelink using communication resources of the first frequency range and configurable to receive data on a sidelink using communication resources of the second frequency range and controller circuitry configured to control the transmitter circuitry and the receiver circuitry so that the communications device is operable to determine a sidelink policy, the sidelink policy indicating whether a communications device is permitted to transmit data on a sidelink using communication resources of a first frequency range and whether the communications device is permitted to transmit data on a sidelink using communication resources of a second frequency range, to determine, based on the sidelink policy, whether the communications device is permitted to transmit data on a sidelink using communication resources of the first frequency range and only if the communications device is permitted to transmit data on a sidelink using communication resources of the first frequency range, to determine a first security key, the first security key for protecting data transmitted via the sidelink using communication resources of the first frequency range, and not for protecting data transmitted via the sidelink using communication resources of the second frequency range.

Paragraph 51. A communications device for operating in a wireless communications network, the communications device comprising a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range, a receiver configurable to receive data on a sidelink using communication resources of the first frequency range and configurable to receive data on a sidelink using communication resources of the second frequency range and a controller configured to control the transmitter and the receiver so that the communications device is operable to determine that the communications device is not permitted to transmit the data on a sidelink using communication resources of the first frequency range, to determine that the communications device is permitted to transmit the data on a sidelink using communication resources of the second frequency range, to transmit or to receive data on a sidelink using communication resources of the second frequency range, and to transmit, to an infrastructure equipment, a sidelink usage report indicating a usage of the sidelink.

Paragraph 52. Circuitry for a communications device for operating in a wireless communications network, the circuitry comprising transmitter circuitry configurable to transmit data on a sidelink using communication resources of a first frequency range and configurable to transmit data on a sidelink using communication resources of a second frequency range, the first frequency range being a licensed frequency range, and the second frequency range being an unlicensed frequency range, receiver circuitry configurable to receive data on a sidelink using communication resources of the first frequency range and configurable to receive data on a sidelink using communication resources of the second frequency range and controller circuitry configured to control the transmitter circuitry and the receiver circuitry so that the communications device is operable to determine that the communications device is not permitted to transmit the data on a sidelink using communication resources of the first frequency range, to determine that the communications device is permitted to transmit the data on a sidelink using communication resources of the second frequency range, to transmit or to receive data on a sidelink using communication resources of the second frequency range, and to transmit, to an infrastructure equipment, a sidelink usage report indicating a usage of the sidelink.

Paragraph 53. A relay communications device for operating in a wireless communications network, the relay communications device comprising a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range, a receiver configurable to receive data on a sidelink using communication resources of the first frequency range and configurable to receive data on a sidelink using communication resources of the second frequency range and a controller configured to control the transmitter and the receiver so that the relay communications device is operable to determine that in accordance with a sidelink policy the communications device is not permitted to transmit the data on a sidelink using communication resources of the first frequency range, to determine that in accordance with the sidelink policy the communications device is permitted to transmit the data on a sidelink using communication resources of the second frequency range, and to select communication resources for the transmission of data in accordance with the sidelink policy.

Paragraph 54. Circuitry for a relay communications device for operating in a wireless communications network, the circuitry comprising transmitter circuitry configurable to transmit data on a sidelink using communication resources of a first frequency range and configurable to transmit data on a sidelink using communication resources of a second frequency range, the first frequency range being a licensed frequency range, and the second frequency range being an unlicensed frequency range, receiver circuitry configurable to receive data on a sidelink using communication resources of the first frequency range and configurable to receive data on a sidelink using communication resources of the second frequency range and controller circuitry configured to control the transmitter circuitry and the receiver circuitry so that the relay communications device is operable to determine that in accordance with a sidelink policy the communications device is not permitted to transmit the data on a sidelink using communication resources of the first frequency range, to determine that in accordance with the sidelink policy the communications device is permitted to transmit the data on a sidelink using communication resources of the second frequency range, and to select communication resources for the transmission of data in accordance with the sidelink policy.

Paragraph 55. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to determine a sidelink policy, the sidelink policy indicating whether a communications device is permitted to transmit data on a sidelink using communication resources of a first frequency range and whether the communications device is permitted to transmit data on a sidelink using communication resources of a second frequency range, to receive a sidelink usage report, the sidelink usage report indicating a usage of a sidelink between a remote communications device and a relay communications device, the communications device being one of the remote communications device and the relay communications device, and to determine, based on the sidelink usage report, whether the communications device has violated the sidelink policy.

Paragraph 56. Circuitry for an infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to determine a sidelink policy, the sidelink policy indicating whether a communications device is permitted to transmit data on a sidelink using communication resources of a first frequency range and whether the communications device is permitted to transmit data on a sidelink using communication resources of a second frequency range, to receive a sidelink usage report, the sidelink usage report indicating a usage of a sidelink between a remote communications device and a relay communications device, the communications device being one of the remote communications device and the relay communications device, and to determine, based on the sidelink usage report, whether the communications device has violated the sidelink policy.

Paragraph 57. A relay communications device for operating in a wireless communications network, the relay communications device comprising a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range, a receiver configurable to receive data on a sidelink using communication resources of the first frequency range and configurable to receive data on a sidelink using communication resources of the second frequency range and a controller configured to control the transmitter and the receiver so that the relay communications device is operable to transmit, to an infrastructure equipment, a sidelink usage report indicating a usage of the sidelink.

Paragraph 58. Circuitry for a relay communications device for operating in a wireless communications network, the circuitry comprising transmitter circuitry configurable to transmit data on a sidelink using communication resources of a first frequency range and configurable to transmit data on a sidelink using communication resources of a second frequency range, the first frequency range being a licensed frequency range, and the second frequency range being an unlicensed frequency range, receiver circuitry configurable to receive data on a sidelink using communication resources of the first frequency range and configurable to receive data on a sidelink using communication resources of the second frequency range and controller circuitry configured to control the transmitter circuitry and the receiver circuitry so that the relay communications device is operable to transmit, to an infrastructure equipment, a sidelink usage report indicating a usage of the sidelink.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2 (Release 15)", June 2018
[2] Holma H. and Toskala A, "LTE for UMTS OFDMA and SC-FDMA based radio access", John Wiley and Sons, 2009
[3] 3GPP TS 23.287 v.16.3.0 "3rd Generation Partnership Project; Technical Specification Group Services and System Aspects; Architecture enhancements for 5G System (5GS) to support Vehicle-to-Everything (V2X) services (Release 16)"
[4] 3GPP TS 36.314 v.16.0.0 "3rd Generation Partnership Project; Technical Specification Group Radio Access Network; Evolved Universal Terrestrial Radio Access (E-UTRA); Layer 2—Measurements (Release 16)"
[5] 3GPP TS 38.885 v.16.0.0 "3rd Generation Partnership Project; Technical Specification Group Radio Access Network; NR; Study on NR Vehicle-to-Everything (V2X) (Release 16)"
[6] 3GPP TS 38.101-1 v.16.4.0 "NR; User Equipment (UE) radio transmission and reception; Part 1: Range 1 Standalone"
[7] 3GPP TS 33.536 v.16.1.0 "Security aspects of 3GPP support for advanced Vehicle-to-Everything (V2X) services"

What is claimed is:

1. A method for a communications device which is configurable to transmit or receive data on a sidelink using communication resources of a first frequency range and is configurable to transmit or receive data on a sidelink using communication resources of a second frequency range, the first frequency range being a licensed frequency range, and the second frequency range being an unlicensed frequency range, the method comprising:

determining that the communications device is prohibited from transmitting the data on a sidelink using communication resources of the first frequency range,
determining that the communications device is permitted to transmit the data on a sidelink using communication resources of the second frequency range, and
transmitting or receiving data on a sidelink using communication resources of the second frequency range.

2. The method according to claim 1, wherein determining that the communications device is not permitted to transmit the data on a sidelink using communication resources of the first frequency range comprises
receiving from an infrastructure equipment an indication that the communications device is not permitted to transmit the data on a sidelink using communication resources of the first frequency range.

3. The method according to claim 1, wherein determining that the communications device is permitted to transmit the data on a sidelink using communication resources of the second frequency range comprises determining that the communications device is provisioned with information indicating that the communications device is permitted to transmit the data on a sidelink using communication resources of the second frequency range.

4. The method according to claim 1, wherein determining that the communications device is not permitted to transmit the data on a sidelink using communication resources of the first frequency range comprises receiving an indication via a wireless access interface that the communications device is not permitted to transmit the data on a sidelink using communication resources of the first frequency range.

5. The method according to claim 4, wherein the wireless access interface is a sidelink wireless access interface.

6. The method according to claim 1, wherein communications device is acting as a remote communications device.

7. The method according to claim 6, the method comprising receiving an indication of communication resources allocated for the transmission of data via a sidelink between the communications device and a communications device acting as a relay communications device, wherein
transmitting or receiving the data on the sidelink comprises transmitting or receiving the data using the allocated communication resources.

8. The method according to claim 1, wherein the communications device is acting as a relay communications device.

9. The method according to claim 8, the method comprising selecting communication resources for the transmission of data via a sidelink between the communications device and a second communications device acting as a remote communications device,
wherein transmitting or receiving the data on the sidelink comprises transmitting or receiving the data using the selected communication resources.

10. The method according to claim 8, wherein
transmitting or receiving the data on the sidelink using communication resources of the second frequency range comprises transmitting data to or receiving data from a remote communications device, and
determining that the communications device is not permitted to transmit the data on a sidelink using communication resources of the first frequency range comprises determining that the remote communications device is not permitted to transmit on a sidelink using communication resources of the first frequency range.

11. The method according to claim 8, wherein the communications device is connected to a core network of a communications network via a wireless backhaul.

12. A communications device for operating in a wireless communications network, the communications device comprising:
a transmitter configurable to transmit data on a sidelink using communication resources of a first frequency range and configurable to transmit data on a sidelink using communication resources of a second frequency range, the first frequency range being a licensed frequency range, and the second frequency range being an unlicensed frequency range,
a receiver configurable to receive data on a sidelink using communication resources of the first frequency range and configurable to receive data on a sidelink using communication resources of the second frequency range and
a controller configured to control the transmitter and the receiver so that the communications device is operable
to determine that the communications device is prohibited from transmitting the data on a sidelink using communication resources of the first frequency range,
to determine that the communications device is permitted to transmit the data on a sidelink using communication resources of the second frequency range, and
to transmit or to receive data on a sidelink using communication resources of the second frequency range.

13. A communications device for operating in a wireless communications network, the communications device comprising:
a transmitter configurable to transmit signals to another communications device,
a receiver configurable to receive signals from the other communications device and
a controller configured to control the transmitter and the receiver so that the communications device is operable
to determine a sidelink policy, the sidelink policy indicating whether the other communications device is permitted to transmit data on a sidelink using communication resources of a first frequency range and whether the other communications device is permitted to transmit data on a sidelink using communication resources of a second frequency range,
to determine, based on the sidelink policy, whether the other communications device is permitted to transmit data on a sidelink using communication resources of the first frequency range and
only if the other communications device is permitted to transmit data on a sidelink using communication resources of the first frequency range, to transmit to the other communications device a first value for determining a first security key comprising one of an encryption key or an integrity key, the first security key for protecting data transmitted via the sidelink using communication resources of the first frequency range, and not for protecting data transmitted via the sidelink using communication resources of the second frequency range.

14. The method according to claim 1, wherein:
in response to determining that the communications device is prohibited from transmitting the data on the sidelink using the communications resources of the first frequency range, and is permitted to transmit the data on the sidelink using communication resources of the second frequency range, transmitting or receiving the data on the sidelink using communication resources of the second frequency range.

15. The communication device according to claim 12, wherein:
the communications device is operable:
to transmit or to receive the data on the sidelink using the communication resources of the second frequency range, in response to determining that the communications device is prohibited from transmitting the data on the sidelink using the communications resources of the first frequency range, and is permitted to transmit the data on the sidelink using communication resources of the second frequency range.

16. The communications device according to claim 13, further comprising:
a second security key comprising one of an encryption key or an integrity key, the second security key for protecting data transmitted via the sidelink using communication resources of the second frequency range.

17. The communications device according to claim 16, wherein:
the first security key only being used for a licensed frequency range corresponding to the first frequency range and the second security key only being used for an unlicensed frequency range corresponding to the second frequency range.

18. The communications device according to claim 17, wherein:
in response to the second security key being used for the licensed frequency range corresponding to the first frequency range the data is discarded, and
in response to the first security key being used for the unlicensed frequency range corresponding to the second frequency range the data is discarded.

* * * * *